(12) United States Patent
Kuriyama et al.

(10) Patent No.: US 8,268,111 B2
(45) Date of Patent: Sep. 18, 2012

(54) METHOD AND APPARATUS FOR FORMING A CONTINUOUS ORIENTED STRUCTURE OF A POLYMER

(75) Inventors: Akira Kuriyama, Atsugi (JP); Takeyuki Sone, Tokyo (JP); Otto Albrecht, Atsugi (JP); Koji Yano, Cambridge (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/355,014

(22) Filed: Jan. 20, 2012

(65) Prior Publication Data

US 2012/0118498 A1 May 17, 2012

Related U.S. Application Data

(62) Division of application No. 11/876,342, filed on Oct. 22, 2007.

(30) Foreign Application Priority Data

Oct. 27, 2006 (JP) ................. 2006-293213
Nov. 24, 2006 (JP) ................. 2006-317537
Nov. 24, 2006 (JP) ................. 2006-317538

(51) Int. Cl.
*B29C 65/14* (2006.01)
(52) U.S. Cl. .................. 156/272.2
(58) Field of Classification Search ............. 156/62.2, 156/155, 272.2, 296
See application file for complete search history.

(56) References Cited

U.S. PATENT DOCUMENTS

| 4,983,318 A | * | 1/1991 | Matsumoto et al. | ..... 252/299.01 |
| 6,010,760 A | | 1/2000 | Miyazaki et al. | |

FOREIGN PATENT DOCUMENTS

| JP | 63-50324 A | 3/1988 |
| JP | 8-47971 A | 2/1996 |
| JP | 2535780 B2 | 7/1996 |
| JP | 2001-81202 A | 3/2001 |
| JP | 2001-253962 A | 9/2001 |
| JP | 2005-171221 A | 6/2005 |
| JP | 2005-328030 A | 11/2005 |
| WO | 2008/047586 A1 | 4/2008 |

OTHER PUBLICATIONS

Munehiro Kozuka et al., "Columnar Assemblies of Aliphatic Poly(acetylene ester)s Prepared with a [Rh(norbornadiene) CI]2 Catalyst. 1H and 13C NMR, X-Ray Diffraction and AFM Studies," 203 Macromol. Chem. Phys. 66-70 (2002).

Alain Rochefort et al., "Electrical Switching in $\pi$-Resonant 1D Intermolecular Channels," 2(8) Nanoletters 877-80 (2002).

Masafumi Yamato et al., "Magnetic Orientation of Polymer Fibers in Liquid Suspensions," Polymer Preprint, Japan, vol. 47, No. 14, 4075-76 (1998).

* cited by examiner

*Primary Examiner* — Daniel McNally
(74) *Attorney, Agent, or Firm* — Fitzpatrick, Cella, Harper & Scinto

(57) ABSTRACT

A method and an apparatus for easily making a continuous oriented structure of a polymer are provided. In making a polymer assembly, single crystals are bonded to each other, an external force, such as an electrical field or a magnetic field, is applied to the single crystals, or a solution of the polymer is applied on a substrate such that the applied solution is linear in shape.

3 Claims, 17 Drawing Sheets

METHOD AND APPARATUS FOR FORMING A CONTINUOUS ORIENTED STRUCTURE OF A POLYMER

CROSS-REFERENCE TO RELATED APPLICATIONS

This application is a divisional application of U.S. patent application Ser. No. 11/876,342, filed Oct. 22, 2007, which claims the benefit of Japanese Application No. 2006-5293213, filed Oct. 27, 2006, Japanese Application No. 2006-317537, filed Nov. 24, 2006, and Japanese Application No. 2006-317538, filed Nov. 24, 2006. All of these applications are hereby incorporated by reference herein in their entirety.

BACKGROUND OF THE INVENTION

1. Field of the Invention

The present invention relates to a method and an apparatus for forming a continuous oriented structure of a polymer.

2. Description of the Related Art

As the degree of integration of electronic circuits has increased, lithographic technology has reached its limits. The bottom-up approach, in particular, molecular devices composed of molecules, has attracted much attention. According to the bottom-up approach, a good inorganic conductor and/or semiconductor pattern can be formed on a substrate in one step, which is difficult to achieve using the existing lithographic technology. The bottom-up approach is highly compatible with large-area substrates and allows the use of substrates, such as plastic substrates, which have excellent impact resistance but poor heat resistance. The bottom-up approach also enables the use of non-flat substrates. Therefore, the bottom-up approach can lower manufacturing costs and provide higher device fabrication flexibility.

According to the bottom-up approach, polymers of good organic conductors and/or organic semiconductors are fundamental materials for molecular device fabrication, and extensive studies have been conducted on such polymers. For example, Japanese Patent Laid-Open No. 2005-328030 teaches a linear macromolecule of a porphyrin compound serving as a conductive molecular material.

Moreover, if polymers of the good organic conductors and/or organic semiconductors are soluble, these polymers can be arranged into desired shapes on substrates by a technique similar to a printing technique. One of the examples of the method for applying a solution of an organic semiconductor to form a desired shape is a method that includes forming a lipophilic region and a lipophobic region on a substrate, applying the solution of the organic semiconductor in an organic solvent over the entire surface of the substrate, and crystallizing the solution only in the lipophilic region. Other examples include a method employing printing technology and a method employing ink jet technology.

In order for the molecular device to achieve peak performance, the molecules or assemblies of molecules constituting the molecular device should be oriented. The process of forming an oriented structure is very important. One typical process for making an oriented structure of an organic polymer is to process a substrate in advance to impart it with the capability of controlling the orientation and then to form an oriented polymer structure on the substrate, e.g., a substrate-rubbing technique, a substrate-grating technique, or the like. Other examples include techniques for forming the oriented structure by applying an external force during formation of an assembly of a polymer, e.g., an electrical field-induced orientation technique, a magnetic field-induced orientation technique, a flow-induced orientation technique, and an epitaxial growth technique. Still another example is a process, such as a stretching-rolling technique, a frictional transfer technique, and an optical orientation technique, in which the external force is applied to achieve the desired orientation after the polymer is formed as an unoriented structure. For example, Japanese Patent Laid-Open No. 8-47971 teaches a superstrong packing band including a laminate of polyolefin films uniaxially oriented by a stretching-rolling technique. Yet another orientation technique involves transferring a polymer film spreading on a water surface onto a substrate (Langmuir-Blodgett technique).

These various orientation techniques have their own advantages and an appropriate technique is selected according to the characteristics of the polymer material and the purpose of the orientation. Whereas the orientation techniques described above involve soluble or meltable polymers, Japanese Patent No. 2535780 teaches a process of making an oriented thin film by sliding an insoluble, unmeltable polymer against a substrate.

Orienting the molecules by these orientation techniques is not only effective in fabrication of conductive molecular devices, but also very important in making various active polymer devices with optical and/or thermal anisotropy. Japanese Patent Laid-Open No. 2001-81202 teaches a sheet having an improved thermal conductivity in the perpendicular direction prepared by orienting the molecules of a polymer having high thermal conductivity in the vertical direction by applying a magnetic field.

However, the techniques of forming a pattern using a printing method to apply a solution of the organic good conductor and/or organic semiconductor on a substrate have several drawbacks.

First, although the applied organic material solidifies on the substrate as the solvent evaporates, this does not ensure that the entire region of the solution will always form an integral single crystal region or that the applied solution will always enter a homogenous polycrystalline state. The crystallinity and the domain size of the polycrystals may vary at different locations, and there may be amorphous regions mixed in the crystals. In such a case, the required performance of the good conductor and/or the semiconductor would not be achieved. This problem becomes more serious as the substrate size and the area onto which the solution is applied increase.

In the case where a transistor or the like is formed by disposing organic semiconductors between microgap electrodes, it is advantageous or essential to have the molecules of the organic semiconductors oriented in parallel to the direction of the gaps between the electrodes. To achieve this, it is necessary to subject a substrate to some kind of treatment for regulating the orientation direction prior to the organic semiconductor device fabrication or to apply an external force, such as an electric field or a magnetic field, during the fabrication of the organic semiconductor.

There are also some problems in the process of forming an oriented structure having a particular degree of orientation or higher.

For example, according to the technique in which a substrate to which the orientation-regulating capacity is imparted in advance is used, it is difficult to conduct a treatment such as rubbing on the substrate with electrodes preliminarily formed thereon.

According to the technique of applying an external force during the formation of a polymer assembly, the external force interacts with the crystal nuclei of the polymer during formation of the assembly and thus limits the direction of the growth of the crystal nuclei, resulting in formation of an oriented structure. In order to form an assembly with a high degree of orientation, these crystal nuclei must be grown in an adequate manner. However, it is possible that the conditions that are optimal for crystal growth are not optimal for achieving the desired orientation.

According to the technique of applying the external force to an unoriented structure, the unoriented structure may rupture, and the stereostructure of the molecule itself may be irreversibly destroyed if the external force is excessively large.

Even if all of the problems described above are overcome, there is still a problem. In an actual production plant, an unoriented structure is stretched and rolled to form a film- or strip-shaped uniaxially oriented structure. If tensile force is used as the external force, a large-scale facility for uniformly applying large force becomes necessary, but such a facility may not necessarily have a capacity to stretch all types of materials without rupture.

In the case of forming an oriented structure by applying external force to an unoriented structure on the substrate, a substrate having a surface that promotes rotation and orientation of the polymer molecules by application of external force must be used. For example, a material that rarely bonds with the polymer chemically or electrostatically needs to be selected, or a substrate free of irregularities that would obstruct movement and rotation of the molecules must be prepared. Due to this requirement, problems arise if an electronic device is made by integrating the oriented structure and the substrate. For example, the electrodes on the substrate may obstruct formation of the polymer assembly. Etching operation for forming the electrodes may roughen the surface of the substrate and the degree of orientation in the portion where the oriented structure contacts the electrode and very close to the substrate would not be sufficiently increased. As a result, the device would not achieve the expected performance.

In making an oriented structure containing a plurality of types of polymers, polymers must be dissolved and mixed in the same solvent. Thus, a combination of polymers not easily miscible with each other, such as a combination of a hydrophobic polymer and a hydrophilic polymer and a combination of a soluble polymer and an insoluble polymer, cannot be used.

SUMMARY OF THE INVENTION

The present invention provides a simplified method for making a continuous oriented structure of polymers and an apparatus for forming such a structure.

In the specification, "continuous oriented structure" means an integral product in which the constituent polymer materials are integrated into a predetermined shape and in which at least one type of polymer constituting the integral product is oriented in the uniaxial direction such that the integral body as a whole exhibits electrical and/or optical anisotropy. The continuous oriented structure may be composed of one type of polymer or a plurality of types of polymers. The constituent polymer materials may be chemically bonded to each other through dissolution and solidification or through melting and solidification so as to form a continuous structure, or may be physically bonded to each other through impact-bonding or press-bonding. The continuous oriented structure may include a lowly oriented or unoriented portion that chemically or physically bonds the uniaxially oriented polymers to each other as long as the continuous oriented structure exhibits some type of anisotropy as a whole due to the uniaxially oriented polymer. In general, a film-shaped continuous oriented structure can be used as the continuous oriented structure.

The present invention includes three aspects.

According to a first aspect and a second aspect of the invention, a method and an apparatus for forming a continuous oriented structure are provided, in which the orientation of the continuous oriented structure is not disturbed even when the continuous oriented structure is used in an electronic device including a substrate with a rough surface or a substrate with electrode formed thereon.

According to a third aspect of the invention, a method and an apparatus for forming a continuous oriented structure or a device incorporating the continuous oriented structure on a substrate are provided, in which a continuous oriented structure of a helical substituted polyacetylene, which is a semiconductor and/or good conductor organic polymer material can be easily formed on a designated portion of the substrate by a solution application method.

Each aspect will now be described in detail below.

The first aspect provides a method for forming a continuous oriented structure of a polymer, comprising the steps of pulverizing a polycrystalline structure of the polymer to form single crystals; applying external force to the single crystals to form a single crystal group containing uniformly oriented single crystals; dissolving or melting surface portions of the single crystals in the single crystal group; and bonding the dissolved or melted single crystals to each other to thereby form a continuous oriented structure.

An apparatus for forming a continuous oriented structure of a polymer comprising a unit configured to pulverize a polycrystalline structure of the polymer to form single crystals; a unit configured to apply external force to the single crystals to form a single crystal group; a unit configured to dissolve or melt surface portions of the single crystals in the single crystal group; and a unit configured to bond the single crystals to each other to form a continuous oriented structure.

The single crystals may be uniformly oriented by application of external force selected from the group consisting of a magnetic field and an electrical field.

The continuous oriented structure may be formed by dissolving the surface portions of the single crystals with a solvent or melting the surface portions of the single crystals by heating.

In the bonding step, the single crystal group may be affixed on a substrate or in a resin to form the continuous oriented structure.

The second aspect provides a method for forming a continuous oriented structure of a polymer, including the steps of preparing oriented fibers of the polymer; applying external force, which may be selected from the group consisting of an electrical field and a magnetic field, to the oriented fibers to form a uniaxially aligned fiber group containing oriented fibers aligned in a uniaxial direction; and forming the uniaxially aligned fiber group into a continuous oriented structure.

In this method, the step of forming the uniaxially aligned fiber group into the continuous oriented structure may include dissolving or melting only surface portions of the fibers of the uniaxially aligned fiber group or affixing the uniaxially aligned fiber group.

An apparatus for forming a continuous oriented structure of a polymer comprising a unit configured to form the polymer into oriented fibers; a unit configured to place the oriented fibers onto a substrate or a liquid surface; a unit configured to form the oriented fibers on the substrate or the liquid surface into a uniaxially aligned fiber group; and a unit configured to form the uniformly aligned fiber group into a continuous oriented structure.

The unit configured to form the uniformly aligned fiber group into the continuous oriented structure may include a unit configured to apply external force to the oriented fibers on the substrate of the liquid surface.

The third aspect provides a method for forming a continuous oriented structure composed of a helical substituted polyacetylene, the method comprising the steps of applying a solution of the helical substituted polyacetylene on a substrate such that the applied solution is linear in shape; and evaporating a solvent in the solution. The principle behind the third aspect is as follows. A helical substituted polyacetylene, which is a semiconductor and/or good conductor organic polymer material having a ribbon-like molecular shape, forms a columnar structure by self-assembly as a solution of the helical substituted polyacetylene solidifies by evaporation of the solvent, thereby giving uniformly oriented molecules. Thus, by applying the solution of the helical substituted polyacetylene on a substrate such that the applied solution is linear in shape and evaporating the solvent therefrom, the flow of the liquid induced by the evaporation makes the molecules align in a uniaxial direction.

According to the third aspect, a device can be made by forming the uniaxially oriented helical substituted polyacetylene structure onto a substrate provided with electrodes and the like.

The third aspect also provides a method for forming a continuous oriented structure composed of a helical substituted polyacetylene, the method including the steps of applying a solution of the helical substituted polyacetylene on a substrate such that the applied solution is linear in shape; and evaporating a solvent in the solution.

The linear shape may have a width of 5 mm or less and an aspect ratio of a length to a width (length/width) of 2 or more.

The linear shape may have a width of 2 mm or less and an aspect ratio of a length to a width (length/width) of 5 or more.

The solution of the helical substituted polyacetylene may be applied using a technique selected from the group consisting of a drawing technique, a printing technique, or an ink jet technique.

According to the first aspect, a continuous oriented structure of a polymer can be formed in a short time. Whereas the existing technology requires a long time for forming a continuous oriented structure such as growing single crystals in order to form an oriented structure by application of external force, the method of the first aspect includes forming a polycrystalline structure in a short time, pulverizing the polycrystalline structure to obtain single microcrystal group, orienting the single microcrystal group in a short time by applying external force, and finally forming the single microcrystal group into a continuous oriented structure.

Since the step of forming crystals is independent from the step of orienting the crystals, conditions optimum for each step can be selected. According to the existing technology, since low temperature is needed to form crystals, a cooling apparatus must be provided to overcome heat generated by the external force such as an electrical field, if not, there will inevitably be a decrease in degree of orientation caused by heat. Such drawbacks of the existing technology can be overcome by this aspect.

According to the second aspect, a continuous oriented structure can be formed by external force weaker than that required in the existing technology. Thus, energy required to generate the external force can be reduced. It is also possible to decrease the production cost of the continuous oriented structure by reducing the size and weight of the apparatus for making the structure itself or associated components of the apparatus such as safeguards and a shield unit for keeping the external force in the apparatus. For example, when a magnetic field is used as the external force, superconducting magnets are used in the existing technology. However, according to the second aspect, permanent magnets are enough, which significantly simplifies the facility configuration and requires no energy such as electric power. Also, when an electrical field is used as the external force, the degree of orientation has not been always high due to dielectric breakdown of the polymer and generation of heat by leak current. However, according to the second aspect, a particular degree of orientation can be reliably expected even when the voltage applied is low.

Under the existing technology, when tensile force is used as the external force, the material has been limited to a pelletized polymer material that can be stretched into sheet without rupture and a stretching machine that can apply uniform force to the entire sheet has been necessary. In contrast, according to the first and second aspects, the polymer pellet is merely stretched to form fibers. Thus, a wide range of materials can be used and oriented by using a simple stretching machine. In this manner, it is possible to orient a plurality of types of polymers having different functions in a single assembly such that the assembly has two or more functions. It also becomes possible for a continuous oriented structure to contain a plurality of types of polymers not easily miscible, such as a combination of a hydrophobic polymer and a hydrophilic polymer and a combination of a soluble polymer and an insoluble polymer.

The third aspect provides a method for forming a continuous oriented structure in which a continuous oriented structure composed of a helical substituted polyacetylene, which is a semiconductor/good conductor organic polymer material, can be easily formed by merely applying a solution of the helical substituted polyacetylene on a portion of the substrate.

Further features of the present invention will become apparent from the following description of exemplary embodiments with reference to the attached drawings.

DESCRIPTION OF THE EMBODIMENTS

Figure 1A:
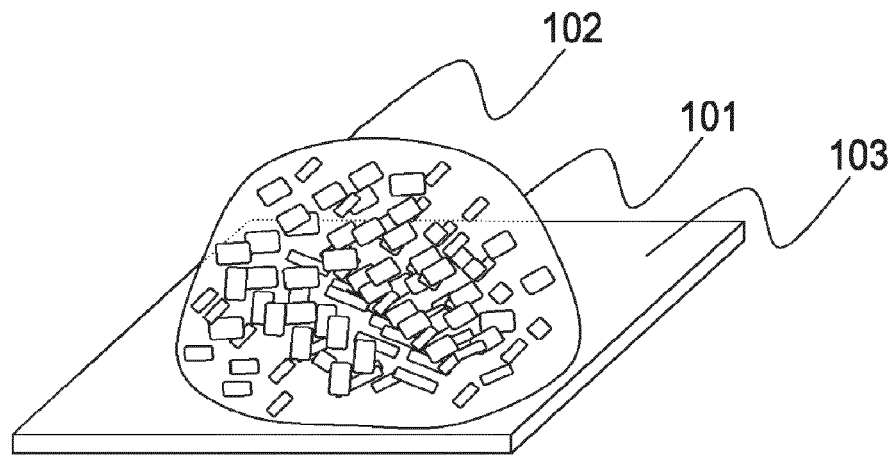
FIGS. 1A and 1B are schematic diagrams showing orientation of pulverized microcrystals (single crystals obtained by pulverizing a polycrystalline structure) by applying a magnetic field.

In the present invention, "polymer" means any polymer that can form crystals in the first and second embodiment below. For example, polymers used or expected to be used as optical materials and conductive materials can be used, e.g., polyacetylene. In the third embodiment below, a helical substituted polyacetylene can be used as the polymer.

The present invention will now be described in detail.
First Embodiment

A method for forming a continuous oriented structure of a polymer according to a first embodiment includes a step of forming single crystals by pulverizing a polycrystalline material of a polymer and a step of applying external force to the single crystals to form a group of uniformly oriented single crystals (single crystal group). The method further includes a step of dissolving or melting surface portions of the individual single crystals in the group to bond single crystals to each other to thereby form a continuous oriented structure.

A method for forming a continuous oriented structure of a polymer and a device incorporating the continuous oriented structure includes four steps, A, B, C, and D. Each step is described below.
Step A: Step of Forming a Polycrystalline Structure of a Polymer A polycrystalline structure of a polymer is formed in this step. "Polycrystalline structure" means a structure in which a plurality or regions (single crystals) 1 μm to 100 μm in diameter and each oriented in a particular direction are bonded together to form one integral structure as a whole but in which the directions of orientation are not uniform. The shape of the polycrystalline structure of the polymer is largely dependent on the characteristics of the polymer and the conditions of formation and thus cannot be generally specified. Polycrystalline structures having a diameter of about 100 μm to 5 mm, mostly about 500 μm to 2 mm can be used. A film having a diameter of 2 cm and a thickness of 100 μm prepared by supplying dropwise a solution of a polymer polycrystalline structure in a solvent onto a flat substrate and evaporating the solvent by adjusting the evaporation conditions may also be used as the polycrystalline structure. If the structure is larger than the above-described size, the pulverization treatment in the subsequent step B described below may become difficult. In such a case, preliminary treatment such as cutting the structure into appropriate size, may be performed.

When the polycrystalline structure is observed with a polarizing microscope on a rotary table, although various parts of the polycrystalline structure glow a particular color and darken as light passes, all parts of the structure never glow simultaneously. This structure is different from a single crystal structure where the entire structure glows simultaneously under a polarizing microscope or from an amorphous structure that does not transmit light under a polarizing microscope.

Various methods are available for forming the polycrystalline structure, and there are no particular limitations on the method used. A method most suitable for the characteristics of the polymer may be used.

For example, when the polymer is soluble in a solvent, a solvent evaporation technique is usually used. When the polymers are insoluble, a vapor deposition technique is used. These techniques are usually used in forming single crystals, but single crystals are formed only under stringent conditions. In other words, in a system under less stringent conditions, single crystals do not grow but a polycrystalline structure is easily obtained.

When the polymer is a protein or rubber, a polycrystalline structure can be easily formed by immersing the polymer in liquid nitrogen or the like to instantly freeze the polymer.

When the polymer takes a columnar structure, such as polyacetylene, a polycrystalline structure can be easily formed by exposing the polymer to a solvent atmosphere.

Note that if the polymer prepared is confirmed with a polarizing microscope to be already in a polycrystalline state, this step may be omitted and the next step B may be directly performed. Alternatively, the step A may still be conducted to further increase the crystallinity.
Step B: Step of Forming Single Crystals by Pulverizing the Polycrystalline Structure of the Polymer Next, single crystals, which are pulverized microcrystals, are formed by pulverizing the polycrystalline structure of the polymers described above. Here, "pulverized microcrystals" means single crystals about 1 μm to 100 μm in diameter obtained by pulverizing the polycrystalline structure.

Whereas single crystal portions of the polycrystalline structure are relatively hard, the portions connecting the single crystals to one another have weak bonding force and are soft. Thus, portions connecting the single crystals to one another break before other portions by application of external force. Accordingly, by conducting pulverization under adequate external force, the connecting portions can be easily broken and individual pieces of single crystals can be obtained. There are various pulverization methods available, and there are no particular limitations on the pulverization method used. An optimum method may be selected as needed. For example, a homogenizer, an ultrasonic homogenizer, or the like can be employed that pulverizes the polycrystalline structure either directly or as a suspension in a solvent that does not dissolve the polymer.
Step C: Step of Applying External Force on the Single Crystals to Form a Single Crystal Group Including Uniformly Oriented Single Crystals The pulverized single microcrystals above are formed into a uniaxially oriented single crystal group by applying external force as the orientation-regulating force. Here, "uniaxially oriented single crystal group" means a group of single crystals oriented in the same direction. The term refers to the state in which all microcrystals are oriented in the same direction and, under a polarizing microscope on a rotary stage, all the microcrystals, i.e., the entire structure, simultaneously glow and darken at particular angles.

There are various methods available for applying external force to obtain the uniaxially oriented single crystal group. There are no particular limitations on the method for applying external force. A method suitable for the characteristics of the polymer, the desired oriented structure, and the characteristics of the device may be employed.

For example, when the polymers are electrically conductive, the substrate is insulative, and an electrical field is used as the external force, crystals can be easily oriented in the direction of the electrical field. In the case where an electronic device is ultimately formed by disposing the oriented structures between the electrodes, the electrodes previously formed in the substrate can be used for orientation using an electrical field as the external force. This is efficient because the alignment operation for matching the direction of the device with the direction of the external force can be omitted. The voltage to be applied may be determined according to the characteristics of the polymer, dielectric breakdown of the substrate, and the like.

When the target oriented structure and the device specially require isolation from any foreign matter or contaminant, a magnetic field may be used as the external force since the operation can be completed in a non-contact manner.

If necessary, a combination of two or more types of the above-described external forces can be used.

In this step, the single crystals may be suspended in water, air, a medium that does not dissolve the polymer, and/or a medium having a melting point significantly lower than that of the polymer to reduce the friction between the substrate and the single crystals and to allow the crystals to orient in a short amount of time.

As a result of this step, a uniaxially oriented single crystal group in which pulverized microcrystals of the polymer are uniaxially oriented is formed.

Step D: Step of Forming the Single Crystal Group into a Continuous Oriented Structure Lastly, the single crystal group oriented in one direction obtained by the above step is formed into a continuous oriented structure. "Continuous oriented structure" means an integral structure which is constituted from singe crystals bonded to each other as a result of effecting a particular treatment to the uniaxially oriented single crystal group and which maintains the uniaxially oriented state as a whole. There are various methods for such a treatment, and there are no particular limitations on the treatment. A method most suitable for the characteristics of the polymer and the characteristics of the target oriented structure may be employed.

For example, when the polymer is soluble or meltable, the same processes as those in step A of making the polycrystalline structure of the polymer may be employed. In particular, the uniaxially oriented single crystal group is semi-dissolved or semi-melted and then the solvent is removed therefrom or the temperature is decreased so that the dissolved or melted surface portions bond to each other to give a continuous oriented structure. Although the orientation of the molecules in the dissolved or thermally melted portions becomes slightly disordered, such portions will be oriented again in the course of resolidification since such portions are microscopic and are affected by the undissolved or unmelted oriented molecules nearby. Thus, the resulting continuous structure maintains a highly uniaxially oriented state.

"Semi-dissolved state" means a state in which single crystals still maintain the oriented state although flowability is generated by relaxation of the bonds between the molecules on the surface caused by the polymer single crystals absorbing the solvent. "Semi-melted state" means a state in which single crystals still maintain the oriented state although flowability is generated by relaxation of the bonds between the molecules on the surface caused by heating the polymer single crystals to a temperature close to the lower of the melting point and the glass transition temperature of the polymer single crystals. As described in step B, the pulverized microcrystals are prepared by pulverizing the polycrystalline structure, and the surfaces thereof have lower crystallinity than other portions. Thus, when the pulverized microcrystals constituting the uniaxially oriented single crystal group are exposed to a solvent or heated to a temperature close to the melting temperature, the microcrystals easily enter the semi-dissolved or semi-melted state in which only the surface portions are dissolved or melted, respectively.

The uniaxially oriented single crystal group may be compressed with a press machine or the like if the molecular structure and/or the stereostructure of the polymer does not change by the pressure and the like. This process may be performed in combination with the semi-dissolving or semi-melting operation described above.

Depending on the usage of the device incorporating the oriented structure, such as a polarizing filter, it may not be necessary to chemically bond the polymer to form an assembly having a molecular-level homogeneity. In such a case, the single crystals in a uniaxially oriented state may be adhered onto or wrapped with an unoriented transparent sheet. Examples of the medium for reducing the friction between the substrate and the crystals described at the last stage of step B include monomers containing polymerization initiators, fluid materials that solidify in response to stimuli such as light, and fluid materials with a melting point significantly lower than that of the polymer. By using these, the uniaxially oriented single crystal group and the medium may be affixed by applying light, decreasing the temperature, or the like a particular time after the orientation of the single crystals.

Although step D may be conducted independently from step C, the risk of a decrease in degree of orientation during step D can be reduced by conducting step D immediately after step C of orienting the single crystal in the uniaxial direction while continuing to apply the external force.

As a result of these operations, the crystal orientations of the individual polymer single crystals can be made uniform, and the individual single crystals in the single crystal group bond to each other to form an integrated structure, thereby forming a continuous oriented structure while maintaining the uniaxially oriented state as a whole.

According to the combination of the four steps described above, a continuous structure of oriented polymers having a practical degree of orientation can be fabricated in a short amount of time. Moreover, it becomes possible to overcome the problem of disordered orientation caused by roughness of the substrate surface or the electrodes on the substrate in the case where an electronic device is made by forming an oriented structure on the surface.

Method of Confirming the Uniaxial Orientation

There are a variety of methods for confirming whether the continuous oriented structure fabricated through these steps has the uniaxial orientation. The simplest of these includes superimposing a polarizing filter confirmed to have a uniaxial orientation on the fabricated continuous oriented structure and then rotating them or rotating the continuous oriented structure placed on a rotary stage of a polarizing microscope so as to examine how light passes through the structure However, according to this method, digitalization is difficult and the change in optical transmittance cannot be confirmed with naked eye when the continuous oriented structure is a thin film. In such a case, an absorptiometer equipped with a polarizing filter may be used for the measurement. The degree of orientation of the uniaxially oriented structure can be digitalized by determining the dichroic ratio D, i.e., $D=(A-B)/(A+B)$, wherein A is absorbance at 0° (maximum absorption intensity) and B is absorbance at 90° (minimum absorption intensity) for the absorption spectrum peaks.

Uniaxial Orientation of the Single Crystal Group by Application of a Magnetic Field The case where a magnetic field is used as the external force in step C will now be described in further detail below.

The method for forming the oriented structure using a magnetic field as the external force involves a phenomenon where molecules or crystals of the compound having two- or three-dimensional anisotropy (e.g., string-shaped, rod-shaped, and plate-shaped molecules or crystals) under the influence of the magnetic field align along the lines of magnetic force or on a plane perpendicular to the lines of magnetic force. Recent improvements in the performance of superconducting magnets have produced magnetic fields having intensities of tens of tesla (referred to as "T" hereinafter), which could not be achieved in the past. Cases of orienting various organic polymers have been reported. For example, Polymer Preprint, Japan vol. 47, No. 14 (1998), p. 4075, reports that polyethylene fibers dispersed in an aqueous solvent oriented on a plane perpendicular to the lines of magnetic force when placed in a superconducting magnet.

The method for orienting the single crystals using a magnetic field will now be described in further detail.

The pulverized microcrystals made in step B are dispersed on a substrate. Examples of suitable substrates include plastic, glass, or silicon substrates.

Figure 1B:
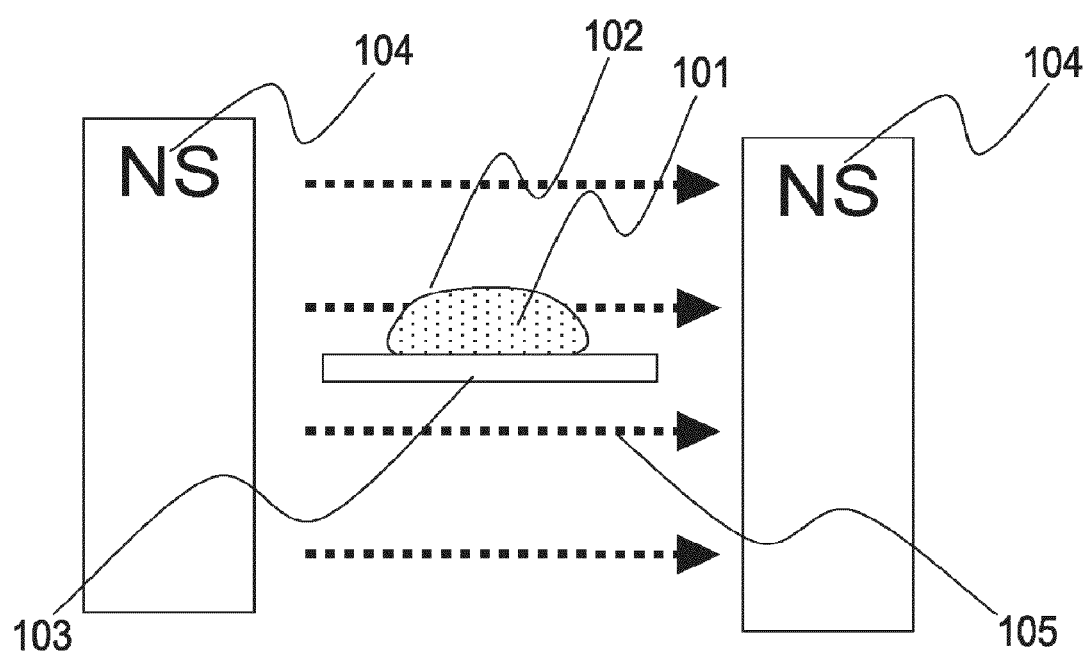

FIGS. 1A and 1B are schematic diagrams showing a method and an apparatus for transforming the pulverized microcrystal group (a group of single crystals obtained by pulverizing the polycrystalline structure) into a uniaxially oriented single crystal group by the application of a magnetic field. As shown in FIG. 1A, a group of single microcrystals (pulverized microcrystal group) 101 obtained by pulverizing the polycrystalline structure is suspended in a medium 102, which is a liquid medium that does not dissolve the polymers and/or a liquid medium having a melting point significantly lower than that of the polymer. When the liquid medium having a melting point significantly lower than that of the polymer is used, suspension is conducted while heating the substrate (the heating unit is not shown in the drawing). In this manner, the frictional resistance between the single crystals 101 and a substrate 103 is reduced. Next, as shown in FIG. 1B, the substrate 103 is placed in a magnetic field produced by a magnetic field-generating apparatus 104. The substrate 103 is arranged to be parallel to the lines 105 of magnetic force in FIG. 1B; however, the arrangement may be adequately changed according to need. In the case where electrodes and the like are previously formed on the substrate, it is necessary to take into account arrangement of the electrodes. The magnetic field-generating apparatus 104 may be any apparatus that can generate magnetic force necessary for orientation, e.g., permanent magnets, common electromagnets, superconducting magnets, and the like.

Placing the substrate 103 in the magnetic field for a particular time renders the single crystals 101 to align in the uniaxial direction. The direction of the arrangement of the substrate, the orientation direction, and the time of exposing the substrate to the magnetic field may be determined on the basis of previous investigations.

Lastly, the medium 102 is removed if necessary. The process of removing the medium 102 differs according to the properties of the medium 102. Conceivable methods are a method of evaporating the medium by heating the substrate (the heating unit is not shown in the drawing), and a method of removing the medium using a nozzle (not shown in the drawing) from one end of the substrate. In any case, care must be taken during the removal of the solvent, such as moderating the flow of the medium and/or, not disturbing the orientation of the uniaxially oriented single crystal group. This operation of removing the solvent may be conducted after completion of the orientation of the single crystals. Alternatively, by setting conditions such that the solvent can be gradually removed even before the completion of the orientation, the time required for the operation in the step B can be slightly reduced.

According to the above-described method using a magnetic force as the external force in step B, it is possible to construct production equipment by providing only the magnetic field-generating unit and a medium-removing unit, if necessary. Moreover, since the substrate does not come into contact with the orientation unit, the risk of contamination during production of the oriented structure is, extremely low, and production with a high yield can be expected.

Uniaxial Orientation of Single Crystal Group by Application of an Electrical Field The case where an electrical field is used as the external force in step C will now be described in further detail.

A method for forming an oriented structure using an electrical field as the external force is based on the phenomenon where molecules or crystals of the compound having two- or three-dimensional anisotropy (e.g., string-shaped, rod-shaped, and plate-shaped molecules or crystals) align under the application of a voltage.

When a dispersion or a solution of molecules is supplied dropwise between the electrodes under the application of a voltage and the dispersion or solution is dried, the molecules frequently fail to form a homogeneous, uniaxially oriented assembly since the molecules are attracted to the electrodes prior to the fabrication of the assembly by the solvent evaporation. This is because the electrical field is not homogeneous and the molecules are attracted to the electrodes by intense electrical fields near the electrodes. Thus, in order to actually make an oriented structure by application of an electrical field, the voltage applied is close to the limit at which the sample breaks. Accordingly, the process is strongly dependent on the voltage applied, electrode structure, electrode material, solvent, temperature, humidity of the atmosphere, and the characteristics of the material.

However, the present inventors have found that this process is effective for aligning single crystals in the same direction because single crystals are highly uniaxially oriented.

The method for aligning the single crystals by applying an electrical field will now be described in further detail.

The single crystals prepared in step A are dispersed on a substrate. There are no particular limitations on the substrate used and any suitable substrate may be used as needed. For example, a plastic, glass, or silicon substrates can be used.

Figure 2A:
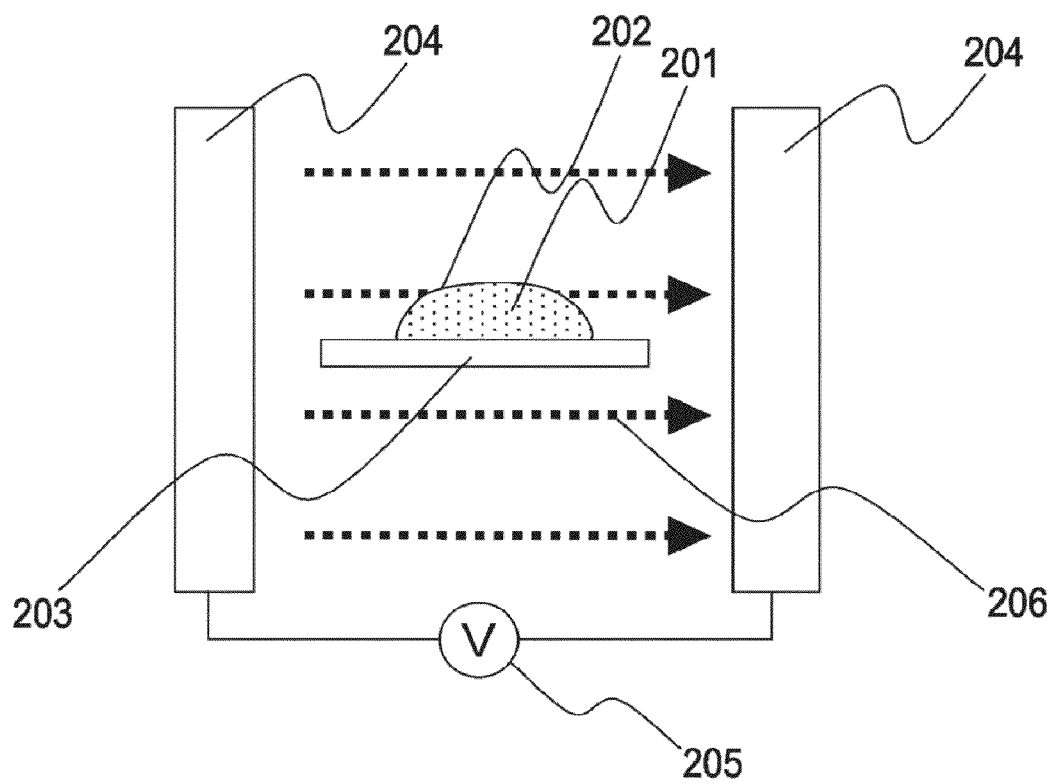
FIG. 2A is a schematic diagram showing alignment pulverized microcrystals (single crystals obtained by pulverizing a polycrystalline structure) by applying an electrical field.
Figure 2B:
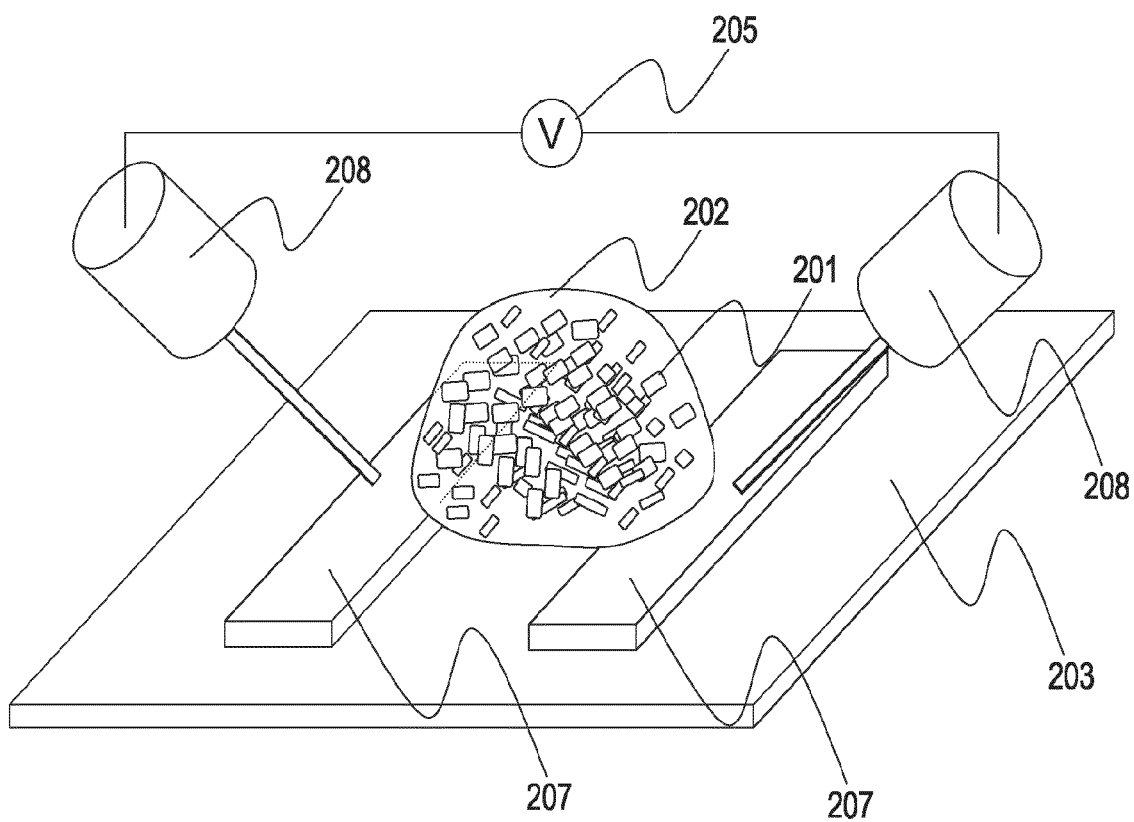
FIG. 2B is a schematic diagram showing alignment of pulverized microcrystals (single crystals obtained by pulverizing a polycrystalline structure) by applying an electrical field.
Figure 2C:
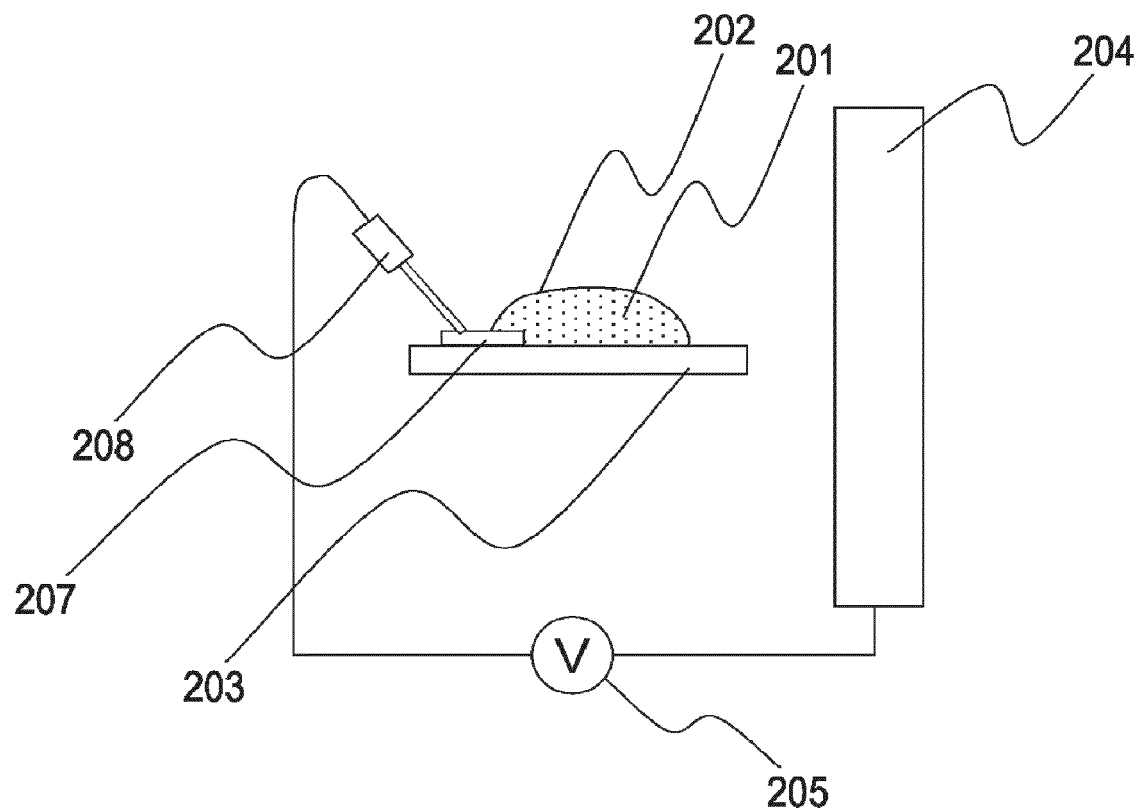
FIG. 2C is a schematic diagram showing alignment of pulverized microcrystals (single crystals obtained by pulverizing a polycrystalline structure) by applying an electrical field.

FIGS. 2A, 2B, and 2C are schematic diagrams showing a method and apparatus for forming a pulverized microcrystal group (a single crystal group obtained by pulverizing a polycrystalline structure) into a uniaxially oriented single crystal group by the application of an electrical field. As shown in FIGS. 2A, 2B, and 2C, single crystals 201 are suspended in a medium 202, which is a nonconductive liquid medium that does not dissolve the polymer and/or a liquid medium having a melting point significantly lower than that of the polymer. When the liquid medium having a melting point significantly lower than that of the polymer is used, the suspension is formed while heating the substrate. In this manner, the frictional resistance between the single crystals 201 and a substrate 203 is reduced.

Next, an electrical field is applied to the single crystals on the substrate. There are two types of methods available, namely, a method involving placing a substrate in the electrical field and a method involving directly applying voltage onto the electrodes formed in the substrate.

According to the method of placing the substrate in the electrical field, as shown in FIG. 2A, the substrate 203 with the single crystals 201 thereon may be placed, for example, between a pair of electrodes 204 facing each other with an insulator such as air between the electrodes. Although the substrate 203 is arranged to be parallel to the electrical field 206 in FIG. 2A, the arrangement may be adequately changed according to need. The substrate 203 may be arranged perpendicular to the electrical field 206 depending on the orientation of the final product of the continuous oriented structure.

According to the method for directly applying voltage to the electrodes formed on the substrate, as shown in FIG. 2B, terminals 208 may be contacted to a pair of electrodes 207 on the substrate to apply a voltage through. Furthermore, when the substrate and the continuous oriented structure on the substrate are to ultimately form some type of electrical device, the electrodes 207 on the substrate for orientation may be used as the electrodes for the device. Moreover, as shown in FIG. 2C, one of the pair of electrodes may be formed as an on-substrate electrode 207 and the other electrode may be formed as an out-of-substrate electrode 204. In such a case also, the arrangement of the substrate 203 may be appropriately adjusted according to need.

Next, a power supply 205 is coupled to the electrode 204 or 207 to apply a voltage for a predetermined length of time. This voltage is dependent on the distance between the electrodes and whether the single crystals are electrically conductive. The upper limit of the voltage is the dielectric breakdown voltage of the substrate. In general, orientation finishes in a shorter time as the voltage is increased. The voltage to be applied and the time of applying the voltage may be determined on the basis of previous investigations.

Lastly, the medium 202 is removed, if necessary. The method for removal differs depending on the characteristics of the medium 202. One conceivable method is to evaporate the solvent by heating the substrate (the heating unit is not shown in the drawing), and another conceivable method is to suck the solvent using a nozzle (not shown) at one end of the substrate. In any case, during the removal of the solvent, care must be taken, such as moderating the flow of the medium and/or not disturbing the orientation of the uniaxially oriented single crystal group. This operation of removing the solvent may be conducted after completion of the orientation of the single crystals. Alternatively, by setting conditions such that the solvent can be gradually removed even before the completion of the orientation, the time required for the operation in the step B can be slightly reduced.

According to the above-described method using an electrical field, it is possible to construct production equipment by providing only an electrical field-applying unit including electrodes, a power supply, etc., and a medium-removing unit, if necessary. Moreover, the electrodes on the substrate during fabrication of the oriented structure can be used as the electrodes of the device. Thus, there is no need for adjustment, such as alignment of the substrate, during fabrication of the oriented structure bridging the electrodes, and production at high throughput can be expected.

Formation of a Continuous Oriented Structure by Dissolution

Formation of the continuous oriented structure by dissolution in step D will now be described in further detail.

If a polycrystalline structure is prepared by dissolving the polymers in a solvent in step A, the uniaxially oriented single crystal group prepared in step C may be processed with the same solvent to yield a semi-dissolved state (state in which only the surfaces of the individual crystals are dissolved) so as to form a continuous oriented structure. During this process, if the oriented crystal group is completely dissolved, then there is a risk that the oriented molecules inside the crystals become disoriented and the degree of orientation after fabrication of the oriented structure is decreased. Thus, it is necessary to control the length of time during which the crystals contact the solvent so that the solvent dissolves only the surfaces of the crystals and does not extensively penetrate inside the crystals, thereby maintaining the insides of crystals in a solid state. The length of time differs according to the type of the polymer and the solvent and may be determined in advance on the basis of investigations. If the solvent is rapidly evaporated from the semi-dissolved crystals absorbing the solvent, then there is a risk that the orientation of the molecules in the portions where the crystals bond to each other by foaming of the solvent become disturbed and the degree of orientation after fabrication of the oriented structure is decreased. Accordingly, it is important to expose the oriented crystal group to a several ppm-order solvent vapor for a predetermine time to yield a semi-dissolved state and then gradually remove the solvent vapor or gradually substitute the solvent vapor with air over 1 hour or more. The optimum values of concentration, time, and the like differ according to the type of the polymer and the solvent, the amount and size of the single crystals, and the like. These values may be appropriately determined in advance on the basis of investigations.

According to the above-described method for making a continuous oriented structure by yielding a semi-dissolved state in step D, the polymers can be formed into a continuous oriented structure with molecular-level homogeneity. Moreover, if the same solvent as in step A is used, the behavior of the oriented crystal group can be easily predicted, and various conditions for the step can be determined easily.

Formation of a Continuous Oriented Structure by Melting

Fabrication of a continuous oriented structure by melting in step D will now be described in further detail.

If, in step A, the polycrystalline structure is made by heating and melting the polymer, the uniaxially oriented single crystal group made in step C may be similarly heated to yield a semi-melted state (only the surfaces of the individual crystals are in a molten state) to from a continuous oriented structure. During this process, if the oriented crystal group is completely melted, then there is a risk that the oriented molecules inside the crystals may be disturbed and the degree of orientation after fabrication of the oriented structure may be decreased. Thus, it is necessary to control the length of time and manner of heating such that only the surfaces of the crystals are melted and that the interiors of the crystals are maintained in a solid state. It is also important to control the rate of heating the oriented crystal group to a moderate level of about 1 to 2° C./min and make the temperature constant before it reaches a temperature close to the lower of the melting temperature and the glass transition temperature. The optimum rate of temperature elevation and the time of heating differ according to the size and the amount of the single crystals and may be determined in advance on the basis of investigations.

According to the above-described method for making the continuous oriented structure by melting in step D, the polymers can be formed into a continuous oriented structure having molecular-level homogeneity. Moreover, since the method requires only to place the substrate in a heating unit, the equipment for step D can be incorporated in the equipment of step C so that step D can be easily performed after step C while continuing to apply the external force.

In forming a continuous oriented structure by dissolving or melting only the surfaces of the crystals, a thinner continuous oriented structure with higher homogeneity can be formed by compressing the uniaxially oriented single crystal group with a press machine or the like if the molecular structure and/or the stereostructure of the polymer is of a type that does not deform under pressure or the like. However, during this step, if the oriented structure is spread as a result of thickness reduction by compression, then the oriented molecules in the crystals may be disturbed and the degree of orientation after fabrication of the oriented structure may decrease. Thus, it is important that a die for a press machine that allows elongation of the work only in the uniaxial direction during compression be prepared and the compression be conducted by arranging the axial direction of the die to be parallel to the orientation of the oriented crystal group. Optimum values for pressure and time differ depending on the size and the amount of the single crystals and may be determined in advance on the basis of investigations.

Formation of a Continuous Oriented Structure by Affixing

Formation of a continuous oriented structure by affixing the uniaxially oriented single crystal group in step D will now be described in further detail.

There are two methods for affixing. One is to bond or wrap (laminate-pack) the uniaxially oriented crystal group, which is prepared by applying an external force to single microcrystals obtained by pulverizing a polycrystalline structure, on or with a sheet having an adhesive thereon. The uniaxially oriented crystal group prepared on the substrate in step C may be affixed to the substrate.

The other method is to imbed a uniaxially oriented crystal group, which is prepared by applying an external force to single microcrystals obtained by pulverizing a polycrystal structure, in a resin or the like to affix the uniaxially oriented crystal group. The method of suspending the crystals in the medium to reduce the friction between the substrate and the crystals is described in step C. In this step, the medium may be a fluid material containing a polymerizable monomer, such as acrylate, and a polymerization initiator, such as benzoyl peroxide, a fluid material, such as UV-curable resin that cures in response to external stimuli, or a fluid material that has a melting point significantly lower than that of the polymer. The uniaxially oriented pulverized crystal group and the medium can be affixed by stimulating or cooling the fluid material after the pulverized single microcrystals are oriented. A similar affixing method is described Japanese Patent Laid-Open No. 2005-171221 (the '221 document) where nanosized crystals of an organic pigment is suspended in a UV-curable resin and the resin is cured by UV irradiation while orienting the crystal in a magnetic field. However, the method for obtaining microcrystal particles is different from that of the present invention. The '221 document reports that a bulk material that causes polarized absorption is produced by this process.

In employing these processes, the sheet or medium used as a substrate for affixing may be any unoriented material that transmits light of a required wavelength if the device incorporating the continuous oriented structure is a polarization/deflection filter. For example, a mixture of methyl methacrylate and benzoyl peroxide may be used as the medium and heated to 50° C. after orienting the pulverized crystals. Another exemplary process involves using a mixture of polyurethane acrylate and benzophenone as the medium and irradiating the medium with UV light after orienting the pulverized crystals.

According to the above-described step D of forming a continuous oriented structure, the oriented microcrystals can be easily formed into a continuous oriented structure while maintaining a high degree of orientation.

Second Embodiment

A second embodiment will now be described in detail. The basic principle of this embodiment can be schematically described as follows.

A method for making a continuous oriented structure of a polymer and a device incorporating the continuous oriented structure includes three steps, namely, E, F, and G below. Each of the steps will now be described.

Step E: Step of Forming Oriented Fibers of a Polymer

First, a polymer is formed into oriented fibers. "Oriented fibers" means string-shaped materials having a long side (length) of 1 µm or more and a short side (outer diameter) of 50 nm or more and including constituent molecules uniaxially oriented in the axis direction (longitudinal direction). Any suitable process may be used to make oriented fibers. A suitable method based on the properties of the polymer may be employed.

For example, if the polymer is soft at room temperature, such as polyethylene, or can be easily formed into a flexible sheet by casting or hot-pressing, such as DNA, then the polymer can be directly stretched to form fine fibers.

When the polymer is of a type that dissolves in a volatile solvent but does not undergo denaturation, such as vinylon or acryl, the polymer either in powder form or agglomerated form may be combined with a small amount of a solvent and then kneaded so that the polymer enters a softened state with a high viscosity. The polymer in the softened state is then stretched by a method similar to a dry spinning method for artificial fibers or ejected through fine nozzles into fine strings.

When the polymer is of a thermoplastic type, such as polyvinyl chloride or polycarbonate, the polymer is heated to a temperature, such as its melting point or glass transition point, where the polymer softens. The polymer is then stretched by a method similar to a melt spinning method or ejected through fine nozzles into fine strings. When the polymer is of a type that dissolves in a nonvolatile solvent, such as cellulose, a solution of the polymer is prepared and ejected in a solidifying liquid through fine nozzles by a process similar to a wet spinning method for artificial fibers so that the solution of polymer solidifies into fine strings. When the polymer is of a type that easily dissolves in a solvent and solidifies by a particular stimulus, the same process may be used. For example, alginic acid dissolves in water and solidifies when it comes in contact with calcium ions.

The description above is directed to the method of forming the polymer into oriented fibers. Alternatively, a monomer or an oligomer of the polymer may be combined and kneaded with a polymerization initiator and then the resulting polymer may be formed into fine fibers by a method similar to the above-described method using the acrylic resin.

Therefore, this embodiment is different from the process of forming a continuous oriented structure as it involves the step of stretching a sheet composed of a polymer. In step E above, it is not necessary to use a stretching machine equipped with a mechanism capable of uniformly applying a stress of 0.1 MPa to 500 MPa over the entire film having a uniform mechanical strength formed in advance.

The method described above is used when the polymer is originally soft or has entered a softened state by some process. When the polymer is of an insoluble or unmeltable type but allows transfer of an oriented thin film on a substrate by frictional transfer, such as, polytetrafluoroethylene (Teflon® (trade name)) or polydimethylsilane, the ribbon-shaped polymer segments transferred onto the substrate surface by frictional transfer may be separated and recovered. When the polymer is of a powder type, the polymer may be press-molded in advance into pellets. Unlike the method of forming a continuous oriented structure in one step by frictional transfer, it is not necessary to use a transfer machine that has a mechanism for pressing the polymer pellets free of irregularities onto a substrate prepared in advance to be free of irregularities, all while uniformly applying a pressure.

The above-described method is a method for forming fibers from a polymer prepared in advance. Alternatively, it is possible to use a process in which fine fibers can be formed during polymerization by a process of ejecting a mixture of a polymerization initiator and a solution of a monomer of the polymer in a solvent or by a process of ejecting the monomer solution in the presence of a polymerization initiator or in a polymerization initiating-environment.

Oriented fibers constituted from molecules of the polymer oriented in the axis direction of the fibers can be made through these steps. These fibers may be directly transferred to step F described below or may be cut or pulverized to a predetermined length, if necessary, before they are sent to step F. The optimum length of the fibers differs according to the external force in step F, the shape of the continuous oriented structure, and the shape of the target device. For example, when a magnetic field or an electrical field is used as the external force, the length is about 1 μm to about 1 mm or preferably, about 100 μm to about 500 μm, and the outer diameter is about 50 nm to about 500 nm or preferably, about 100 nm. When vibration or flow of the medium is used as the external force, the length can be about 1 mm to about 10 cm.

Step F: Step of Applying an External Force to Oriented Fibers to Form a Fiber Group Oriented in the Uniaxial Direction The oriented fibers prepared in the previous step E are formed into an oriented fiber group by application of an external force. There are no limitations on the method, and any suitable method based on the properties of the polymer and the features of the continuous oriented structure and device to be produced may be used.

For example, when the polymer is electrically conductive and the substrate is insulative, an electrical field may be used as the eternal force such that the fibers easily orient in the direction of the electrical field. When the continuous oriented structure is interposed between the electrodes to ultimately form an electronic device, an electrical field may be used as the external force so that the electrodes formed on the substrate can be used for orientation, thereby omitting the step of aligning the direction of the device with the direction of the external force, thus, achieving high efficiency. The voltage applied may be determined by considering the properties of the polymer, the dielectric breakdown of the substrate, and the like.

Where a ribbon-shaped continuous oriented structure elongated in the orientation direction or rigid oriented fibers having a length of several centimeters can be easily formed through step E, oriented fibers may be stacked on a substrate having a recess, a groove, or a projection extending in the uniaxial direction, and the substrate may be vibrated. In the case where the oriented fibers are not rigid or are curved, the fibers may be roughly oriented by the above-described process, then have one end thereof fixed, and be exposed to a flow of a medium, such as water, air, or the like, that does not dissolve the polymer so that the oriented fibers are aligned in the direction of the flow.

Moreover, when the continuous oriented structure or device to be produced needs to be isolated as much as possible from contaminants and foreign matter or when the continuous oriented structure or device to be produced may break by vibration, a magnetic field may be used as the external force. In such a case, the operation can be completed without vibrating or making contact.

In this step, in order to reduce the friction between the substrate and the oriented fibers and to align the fibers with a smaller external force in a shorter amount of time, the polymer may be suspended in a medium that does not dissolve the polymer or in a medium having a melting point significantly lower than that of the polymer.

By conducting these operations, a uniaxially aligned fiber group can be made, wherein the oriented fibers composed of molecules of the polymer oriented in the axis direction of the fibers are uniaxially aligned.

Step G: Step of Forming the Uniaxially Aligned Fiber Group into a Continuous Oriented Structure Lastly, the fiber group in which the fibers are aligned in a uniaxial direction by the preceding step is formed into a continuous oriented structure.

There are various methods for forming the oriented structure and there are no particular limitations on the method. A suitable method based on the characteristics of the polymer and the features of the continuous oriented structure may be employed.

For example, in the case where the polymer is soluble or meltable, only the surface portions of the fibers of the uniaxially aligned fiber group are dissolved or melted so that most of the oriented fibers enter a semi-dissolved or semi-melted state. Then the solvent is removed therefrom or the fibers are cooled so that the dissolved or melted surface portions bond to each other to form a continuous oriented structure. Although the orientation of the molecules in the dissolved or melted portions becomes slightly disordered, such portions will be oriented again in the course of resolidification since such portions are microscopic and are affected by the undissolved or unmelted oriented molecules nearby.

"Semi-dissolved state" means a state in which the oriented fibers of the polymer still maintain the oriented state although flowability is generated by relaxation of the bonds between the molecules on the fiber surfaces by the oriented fibers absorbing the solvent. "Semi-melted state" means a state in which the oriented fibers of the polymer still maintain the oriented state although flowability is generated by relaxation of the bonds between the molecules on the fiber surfaces by heating the fibers to a temperature close to the lower of the melting point and the glass transition temperature of the fibers. As described in step E, the oriented fibers are composed of polymer molecules aligned in the longitudinal direction by a stretching technique or the like, and the surfaces thereof have lower crystallinity than central portions. Thus, when the oriented fibers are exposed to a solvent or heated to a temperature near the melting point, the oriented fibers easily enter a semi-dissolved or semi-melted state in which only the surface portions are dissolved or melted. Although the orientation of the molecules in the dissolved or melted portions becomes slightly disordered, such portions will be oriented again in the course of resolidification since such portions are microscopic and are affected by the undissolved or unmelted oriented molecules nearby. Consequently, the resulting continuous structure maintains a highly uniaxially oriented state.

The uniaxially aligned fiber group may be compressed with a press machine or the like if the molecular structure and/or the stereostructure of the polymer does not change by the pressure and the like. This process may be performed in combination with the semi-dissolving and semi-melting operation described above.

Depending on the usage of the device incorporating the oriented structure, such as a polarizing filter, it may not be necessary to chemically bond the polymer to form an oriented structure having molecular level homogeneity. In such a case, the uniaxially aligned fiber group may be affixed while maintaining the orientation so as to form an integrated continuous oriented structure. During this process, it is not necessary to closely pack the uniaxially oriented fibers to eliminate gaps as long as the continuous oriented structure retains desired optical anisotropy.

The specific method for affixing the fibers is not particularly limited. A method suitable for optical characteristics required for the oriented structure and the like may be adequately selected.

For example, the oriented fibers in a uniaxially oriented state may be bonded onto or wrapped with an unoriented transparent sheet. A solidifiable fluid material may be used as the medium for reducing the friction between the substrate and fibers as described in the last stage of step F above. Examples of the solidifiable fluid material include a mixture of a monomer and a polymerization initiator, a fluid material that solidifies by a stimulus, such as light or the like, and a fluid material that has a melting point significantly lower than that of the polymer. After the oriented fibers are aligned and left to stand for a predetermined time, the uniaxially aligned fiber group may be solidified together with the fluid material by irradiation, cooling, or the like.

Although step G may be conducted at a place different from and independently from step F, the risk of a decrease in degree of orientation during step G can be reduced by conducting the step G immediately after step F of orienting the fibers in the uniaxial direction while continuing to apply the external force.

As a result of these operations, the fibers composed of polymer molecules aligned in the axial direction of the fiber can be uniaxially aligned, and the fibers in the fiber group bond to one another to form an integral structure, thereby giving an oriented structure retaining a uniaxially oriented state as a whole.

Through the combination of these three steps, a continuous oriented structure of the polymer can be formed with a smaller external force, it can be formed on a substrate having projections and recesses due to the electrodes, and it can be formed containing two or more types of polymers immiscible with one another.

Formation of Oriented Fibers by Stretching

Formation of oriented fibers by stretching in step E will now be described in further detail.

Figure 3A:
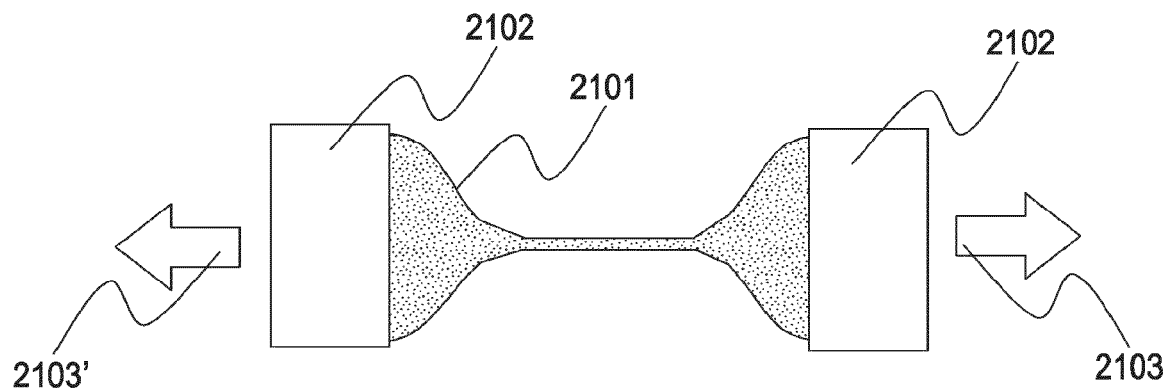
FIGS. 3A to 3C are schematic diagrams showing a method for making oriented fibers by stretching.
Figure 3B:
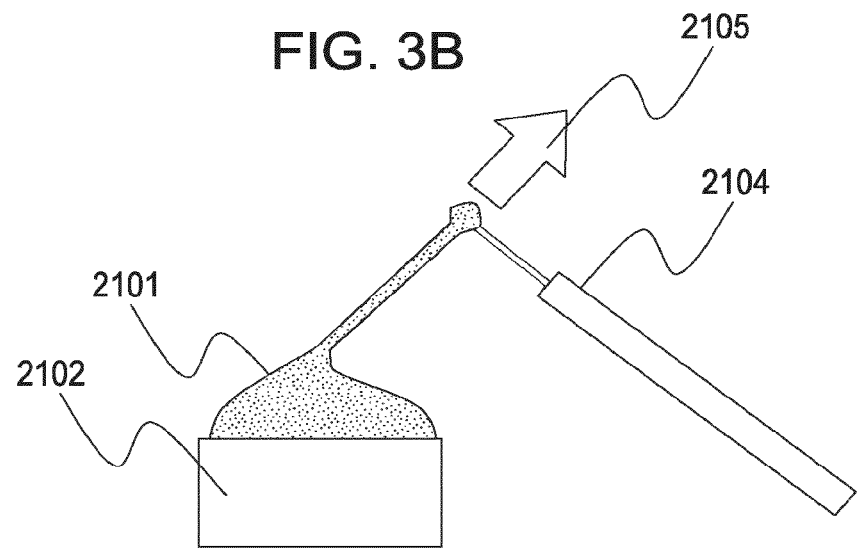
Figure 3C:
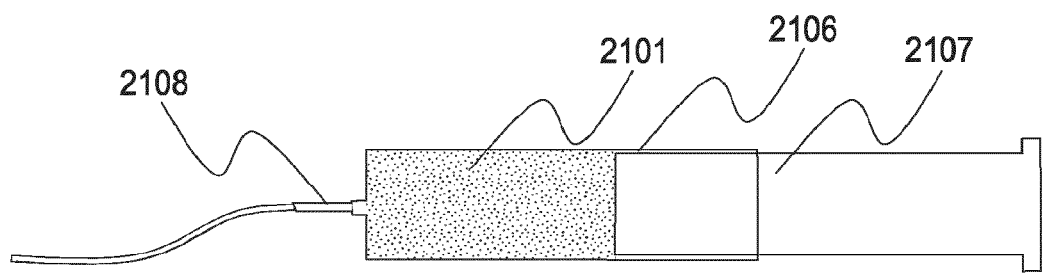

FIGS. 3A to 3C are schematic diagrams illustrating a process of making oriented fibers by stretching.

The process for making oriented fibers by stretching involves a phenomenon where molecules of the compound having two- or three-dimensional anisotropy (e.g., string-shaped, rod-shaped, and plate-shaped molecules) align in the direction of stretching once they are stretched. First, the polymer is softened by a process such as kneading with a small amount of solvent, heating to a temperature near its melting point or glass transition point, or the like. As shown in FIG. 3A, a softened polymer 2101 is held between a pair of clamps 2102 and pulled in the directions of arrows 2103 and 2103'. As shown in FIG. 3B, a needle 2104 is inserted in the polymer 2101 to pull the polymer 2101 in the direction of the arrow 2105. Through these operations, the polymer 2101 forms a string. The central portion of the string where the thickness is uniform may be cut and recovered. It is also possible to have one end of the string wound on a spinning wheel and rotate the spinning wheel to produce a string of a particular shape of a meter order, although this is not shown in the drawing.

Alternatively, as shown in FIG. 3C, the polymer 2101 may be charged in a cylinder 2106 and pushed out with a piston 2107 through a nozzle 2108 having an inner diameter corresponding to the thickness of the fiber to be produced. In this manner, the shape and the degree of orientation of the oriented fiber can be made constant. The conditions such as strength and rate of pulling the polymer for stretching, the magnitude of the force and rate of pushing the piston, and the like may be determined by conducting investigations in advance while considering the properties of the softened material and the required thickness of the fibers.

The application range of the stretching method described in step E is wide and can be applied to a polymer that is soft in a normal state and also to a polymer that enters a softened state by addition of a solvent and/or heating. Moreover, this method can be conducted with relatively simple equipment.

Formation of Oriented Fibers by Frictional Transfer

Formation of oriented fibers by frictional transfer in step E will now be described in further detail.

Figure 4:
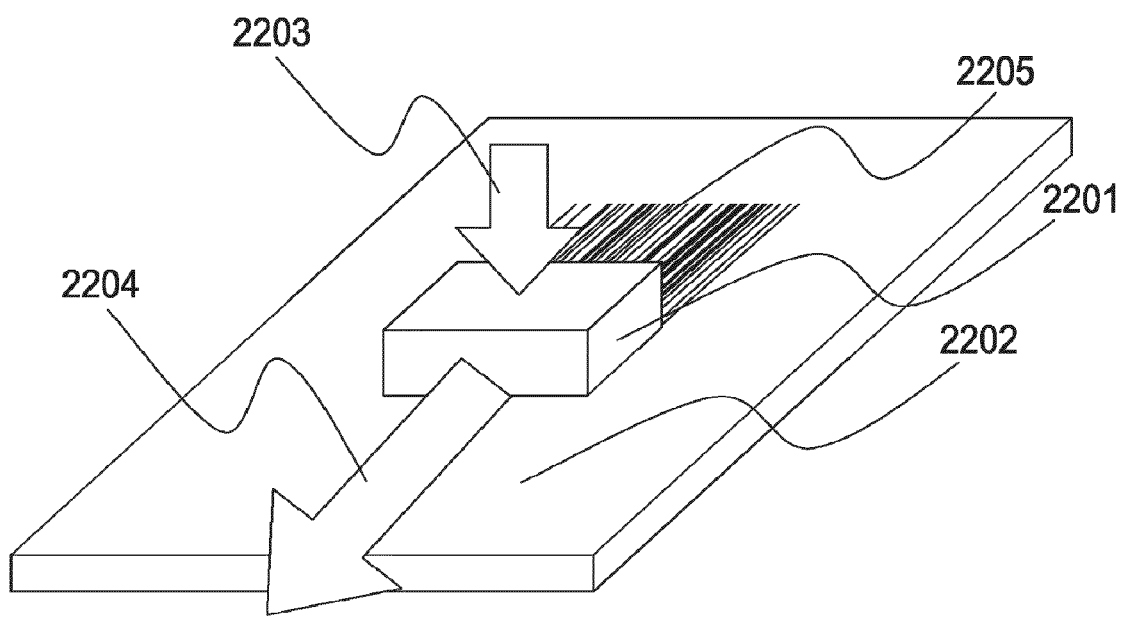
FIG. 4 is a schematic diagram showing another method for making oriented fibers.

FIG. 4 is a schematic diagram showing a method for producing oriented fibers.

In order to produce a continuous oriented structure by an existing orientation technique, the starting material must be a soft material, a material that can be dissolved in a solvent to form a solution, or a material that enters a liquid state or softened state by melting. Thus, it has been considered impossible to form a continuous oriented structure composed of an insoluble, unmeltable material such as polytetrafluoroethylene (Teflon® (trade name)) or polydimethylsilane. However, Nature 352, pp. 414 to 417 (1991) reports that by frictionally transferring a polytetrafluoroethylene pellet onto a substrate surface at a particular temperature, the polytetrafluoroethylene pellet can be formed into continuous oriented structures aligned in the sliding direction of the pellet.

The method and the principle for producing the oriented fibers in step E are the same as those described in the above-referenced Nature article. In forming a film-shaped continuous oriented structure by frictional transfer, the surface of the polymer pellet and the surface of the substrate must be made as smooth and flat as possible. Also, a device that presses the polymer pellet onto the surface of the substrate with uniform pressure and that moves the pressed pellet, is necessary. In contrast, in forming the oriented fibers, there is no need to conduct plane grinding on the substrate and the pellet. As shown in FIG. 4, a polymer pellet 2201 is pressed against a substrate 2202 with a given force applied in the direction of the arrow 2203 and is slid in the direction of the arrow 2204 at a given rate. In this manner, fibrous or ribbon-shaped oriented structures 2205 adhering to the substrate surface after sliding are simply separated and recovered from the substrate 2202. The substrate used here may be any substrate that has a flat surface relative to the thickness of the fiber and hardness lower than that of the polymer pellet. Any suitable substrate may be used according to the requirements. If necessary, a heating unit (not shown) may be attached to the rear surface of the substrate 2202. The conditions such as force of pressing the pellet against the substrate and the sliding rate of the pellet may be determined on the basis of the preliminary investigations by considering the properties of the pellet, the required thickness of the fiber, and the like.

The frictional transfer technique in step E described above can be used for an insoluble, unmeltable polymer unsuitable for the aforementioned stretching technique. Moreover, the frictional transfer technique can be enforced with relatively simple equipment.

Uniaxial alignment of the oriented fibers by the application of a magnetic field The case where a magnetic field is used as the external force in step F will now be described in further detail below.

The principle of the method for making the oriented structure by applying a magnetic field as the external force has been described in detail in the first embodiment, and the description therefor is omitted here to avoid redundancy. The method of uniaxially aligning the oriented fibers by applying a magnetic field is described in further detail below.

Figure 5A:
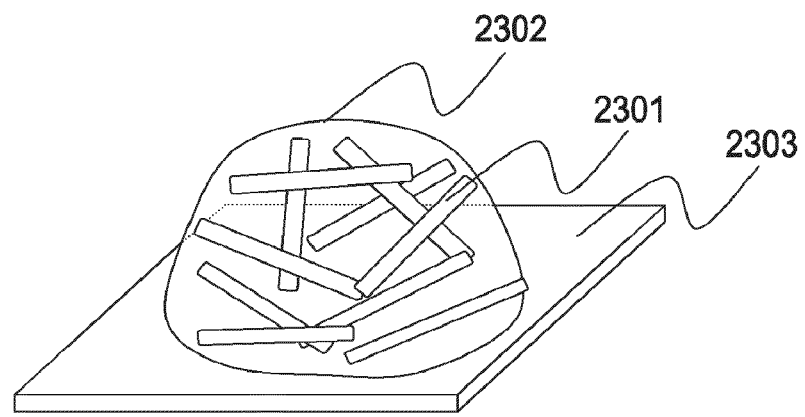
FIGS. 5A and 5B are schematic diagrams showing alignment of oriented fibers by applying a magnetic field.
Figure 5B:
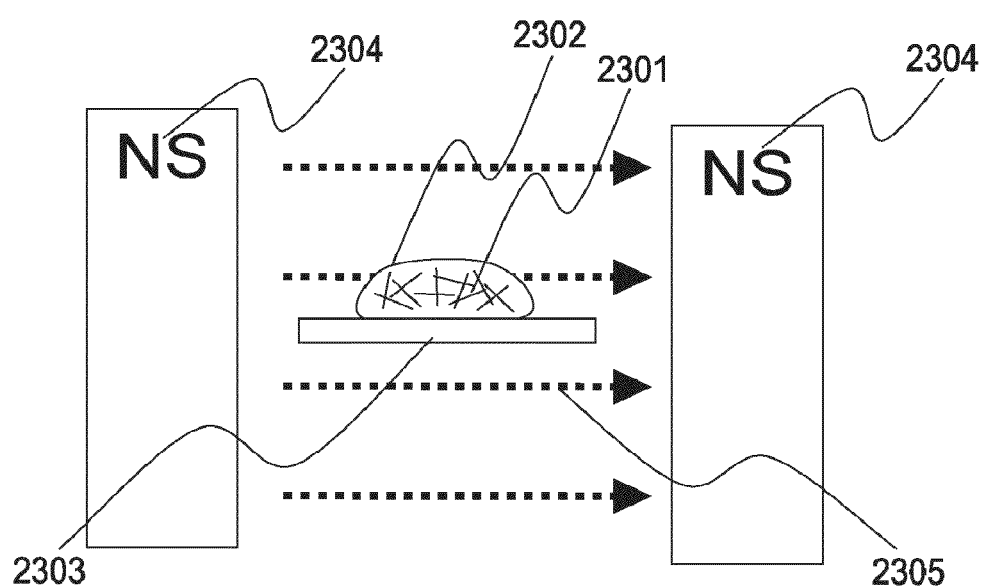

FIGS. 5A and 5B are schematic diagrams showing the alignment of the oriented fibers by applying a magnetic field.

First, the oriented fibers prepared in step E are dispersed on a substrate. A suitable substrate may be selected as needed. For example, a substrate composed of plastic, glass, silicon, or the like can be used. As shown in FIG. 5A, oriented fibers 2301 are suspended in a medium 2302, which is a liquid medium that does not dissolve the polymer and/or a liquid medium having a melting point significantly lower than that of the polymer. This suspension is conducted while heating the substrate when the liquid medium having a melting point significantly lower than that of the polymer is used (the heating unit is not shown in the drawing). In this manner, frictional resistance between the fibers 2301 and a substrate 2303 can be reduced. Next, as shown in FIG. 5B, the substrate is placed in a magnetic field produced by a magnetic field-generating apparatus 2304. The substrate 2303 is arranged parallel to lines 2305 of magnetic force in FIG. 5B; however, the arrangement may be adequately changed as needed. In the case where electrodes and the like are previously formed on the substrate, it is necessary to consider the directions of the arrangement of the electrodes. The magnetic field-generating apparatus 2304 may be any apparatus that can generate magnetic force necessary for orientation, e.g., permanent magnets, common electromagnets, superconducting magnets, and the like. Since the oriented fibers having a length of 5 μm or more uniaxially align by the application of a magnetic force as low as 0.5 T, strong permanent magnets, such as samarium-cobalt, neodymium, or the like that require only a simple mechanism and no electric power, can be used.

Placing the substrate 2303 in the magnetic field for a particular time renders the oriented fibers 2301 to align in the uniaxial direction. The direction of the arrangement of the substrate, the direction of alignment, and the timing of placing the substrate in the magnetic field may be determined on the basis of previous investigations.

Lastly, the medium 2302 is removed, if necessary. The process of removing the medium 2302 differs according to the properties of the medium 2302. Conceivable methods are a method of evaporating the medium by heating the substrate (the heating unit is not shown in the drawing), and a method of removing the medium using a nozzle (not shown in the drawing) at one end of the substrate. In any case, care must be taken during the removal of the solvent, such as moderating the flow of the medium, not to disturb the uniaxial alignment of the fiber group. This operation of removing the solvent may be conducted after the completion of the alignment of the fibers. Alternatively, by setting conditions such that the medium can be gradually removed even before the completion of the alignment, the time required for the operation in step F can be slightly shortened.

According to the above-described method using a magnetic force as the external force in step F, it is possible to construct production equipment by providing only the magnetic field-generating unit and a medium-removing unit, if necessary. Moreover, since the substrate does not come into contact with the means for orientation, the risk of contamination during the production of the oriented structure is extremely low, and production with high yield can be expected. Furthermore, when permanent magnets are used as the magnetic field-generating source, a uniaxially aligned fiber group can be made with little energy and at low costs.

Uniaxial Alignment of Oriented Fibers by Application of an Electrical Field

The case of using an electrical field as the external force in step F will now be described in further detail.

The principle of making the oriented structure by application of an electrical as the external force has been described in detail in the first embodiment and the description therefor is omitted to avoid redundancy. When the polymer to be aligned is fibrous, has a length of 5 μm or more, is oriented and is placed in an electrical field, an electrical charge is generated at both the ends of each fiber, thereby generating turning force. As a result, the fibers move in the direction parallel to the electrical field where the turning force becomes minimum and the fibers thus align in the uniaxial direction.

The method for uniaxially aligning oriented fibers by the application of an electrical field will now be described in further detail.

Figure 6A:
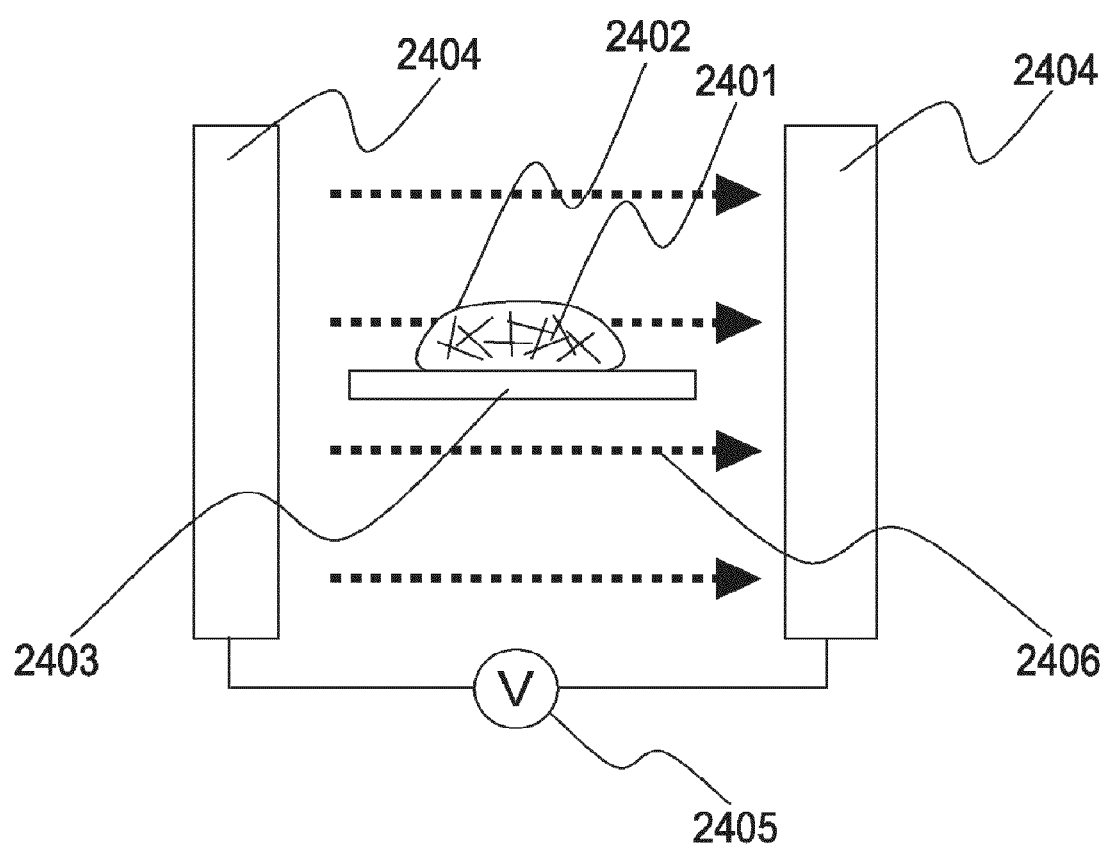
FIGS. 6A to 6C are schematic diagrams showing alignment of oriented fibers by applying an electrical field.
Figure 6B:
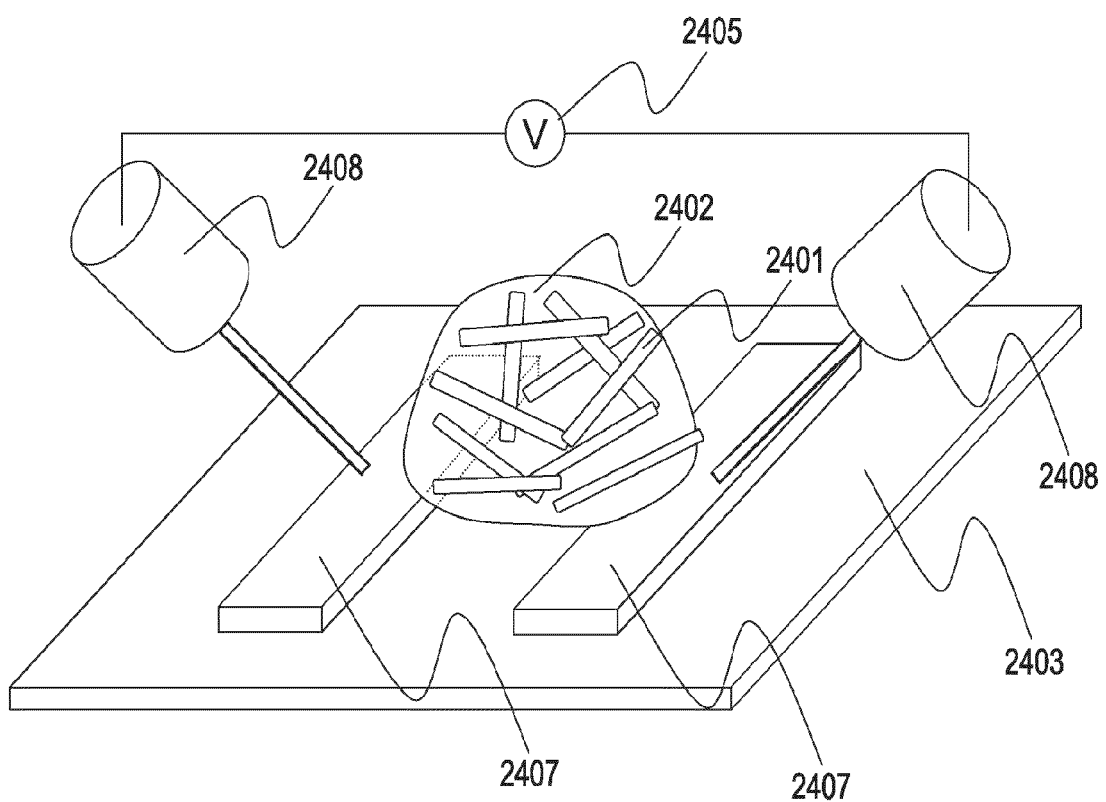
Figure 6C:
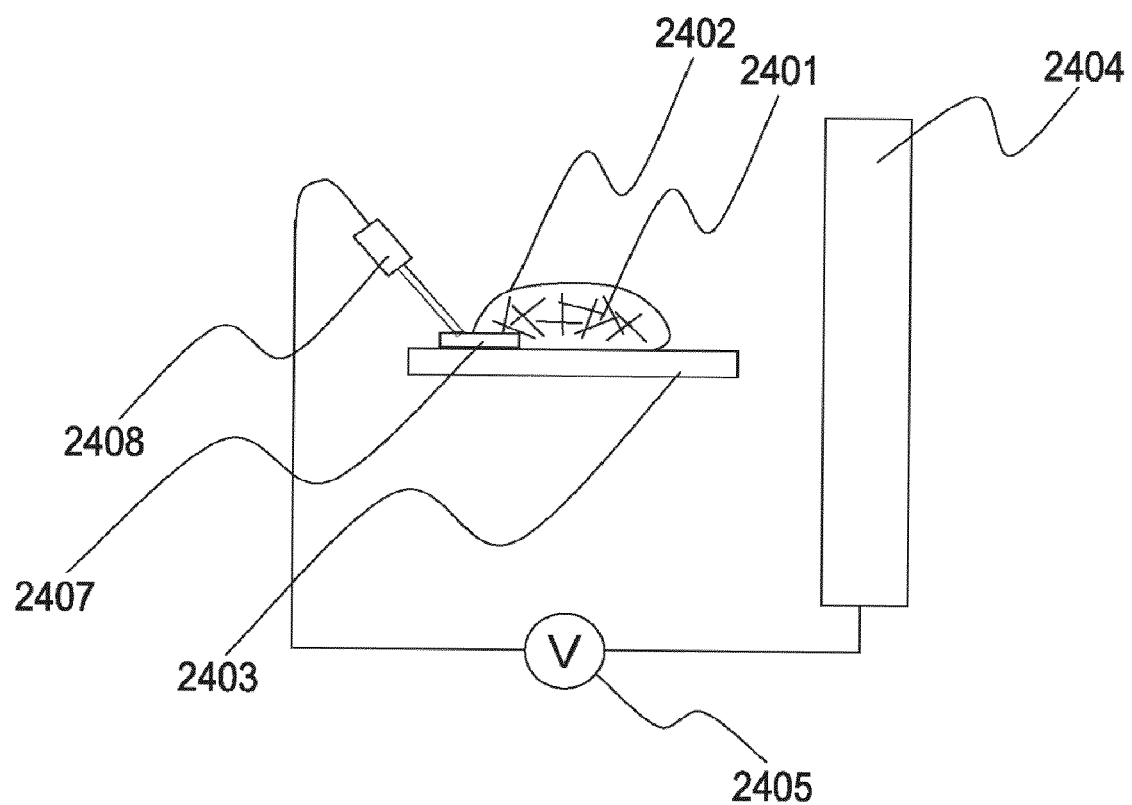

FIGS. 6A to 6C are schematic diagrams showing alignment operation of the oriented fibers by the application of an electrical field.

First, the oriented fibers prepared in step E are dispersed on a substrate. A suitable substrate may be selected as needed. For example, a substrate composed of plastic, glass, silicon, or the like can be used. As shown in FIGS. 6A to 6C, oriented fibers 2401 are suspended in a medium 2402, which is a liquid medium that is nonconductive and does not dissolve the polymer and/or a liquid medium having a melting point significantly lower than that of the polymer. When the liquid medium having a melting point significantly lower than that of the polymer is used, the suspension is formed while heating the substrate (the heating unit is not shown in the drawing). In this manner, the frictional resistance between the oriented fibers 2401 and the substrate 2403 can be reduced.

Next, an electrical field is applied to the oriented fiber's on the substrate. There are two types of methods available, namely, a method involving placing a substrate in the electrical field and a method involving directly applying a voltage onto the electrodes formed on the substrate.

According to the method of placing the substrate in the electrical field, as shown in FIG. 6A, the substrate 2403 with the oriented fibers 2401 thereon may be placed, for example, between a pair of electrodes 2404 facing each other with an insulator such as air between the electrodes. Although the substrate 2403 is arranged to be parallel to an electrical field 2406 in FIG. 6A, the arrangement may be adequately changed as needed. The substrate 2403 may be arranged perpendicular to the electrical field 2406 if the fibers are to be aligned perpendicular to the substrate.

According to the method for directly applying voltage to the electrodes formed on the substrate, as shown in FIG. 6B, terminals 2408 may be contacted to a pair of electrodes 2407 on the substrate to apply a voltage through. Furthermore, when the substrate and the continuous oriented structure on the substrate are to ultimately form some type of electrical device, the electrodes 2407 on the substrate for alignment may be used as the electrodes of the device. Moreover, as shown in FIG. 6C, one of the pair of electrodes may be formed as an on-substrate electrode 2407 and the other electrode may be formed as an out-of-substrate electrode 2404. In such a case also, the arrangement of the substrate 2403 may be appropriately changed according to need.

Next, a power supply 2405 is coupled to the electrode 2404 or 2407 to apply a voltage for a predetermined length of time. This voltage is dependent on the distance between the electrodes and whether the oriented fibers are electrically conductive. The upper limit of the voltage is the dielectric breakdown voltage of the substrate. In general, alignment finishes in a shorter time as the voltage is increased. The voltage to be applied and the time of applying the voltage may be investigated and determined in advance.

Lastly, the medium 2402 is removed, if necessary. The method for removal differs depending on the characteristics of the medium 2402. One conceivable method is to evaporate the medium by heating the substrate (the heating unit is not shown in the drawing), and another conceivable method is to suck the medium using a nozzle (not shown) at one end of the substrate. In any case, during the removal of the solvent, care must be taken, such as moderating the flow of the medium and/or not disturbing the alignment of the uniaxially aligned fiber group. This operation of removing the medium may be conducted after completion of the alignment of the oriented fibers. Alternatively, by setting conditions such that the medium can be gradually removed even before the completion of the alignment, the time required for the operation in the step F can be slightly reduced.

According to the above-described method using an electrical field, it is possible to construct production equipment by providing only an electrical field-applying unit including electrodes, a power supply, etc., and a medium-removing unit, if necessary. Moreover, the electrodes on the substrate during fabrication of the oriented structure can be used as the electrodes of the device. Thus, there is no need for alignment of the substrate during formation of the oriented structure bridging the electrodes, and production at high throughput can be expected.

Uniaxial Alignment of Oriented Fibers by Applying Vibration

The case of using vibration as the external force in step F will now be described in further detail.

The method of uniaxially aligning the oriented fibers by applying vibration as the external force involves applying periodic or non-periodic vibration to randomly aggregated materials having two-dimensional anisotropy, such as materials having a shape of string, rod, or the like. As a result, the materials become ordered and align in the uniaxial direction. However, according to such a phenomenon, the direction of the alignment of the materials having shape anisotropy cannot be usually specified. Thus, recesses parallel to the alignment direction may be formed in the substrate on which the anisotropic materials are to be placed, or grooves parallel to the alignment direction may be formed in the substrate surface.

The method for uniaxially aligning the oriented fibers by applying vibration will now be described in further detail.

Figure 7A:
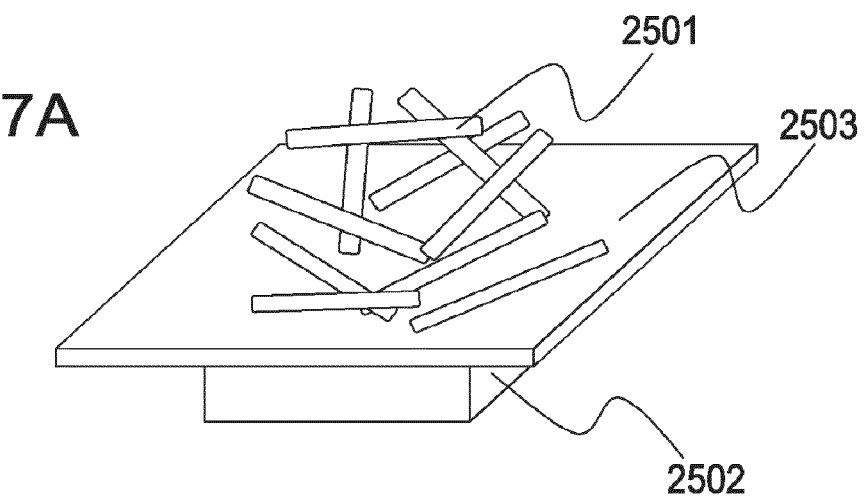
FIGS. 7A to 7C are schematic diagrams showing alignment of oriented fibers by applying vibration.
Figure 7B:
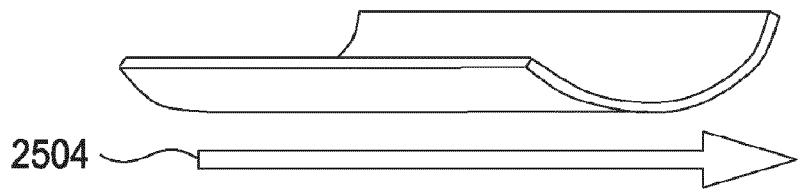
Figure 7C:
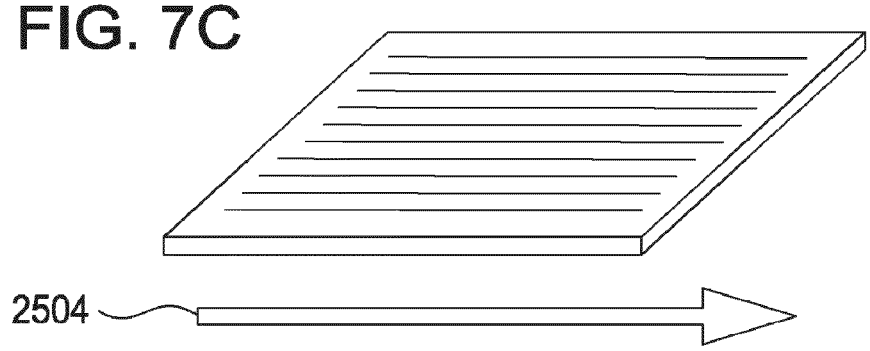

FIGS. 7A to 7C are schematic diagrams showing alignment of the oriented fibers by vibration.

First, the oriented fibers prepared in step E are dispersed on a substrate. This substrate may be any suitable substrate selected as needed. As shown in FIG. 7A, oriented fibers 2501 prepared in step E are dispersed and stacked on a substrate 2503 fixed on a vibration unit 2502. The substrate 2503 needs to be shaped similar to the side face of a cylinder as shown in FIG. 7B or a flat plate having a surface with grooves extending in the uniaxial direction and/or projections extending in the uniaxial direction as shown in FIG. 7C. The substrate may be in either one of these shapes and the substrate shape may be selected as needed. When the substrate shown in FIG. 7B is used, there will be a slight difference in thickness of the resulting continuous oriented structure between the central portion and the peripheral portions. When the substrate shown in FIG. 7C is used, there will remain streaks of projections and/or recesses on the reverse side of the resulting continuous oriented structure. In any case, the oriented structure is polished to make the thickness uniform or to remove projections in order to obtain an oriented structure with uniform thickness. Note that in FIGS. 7B and 7C, the arrow 2504 indicates the direction in which the oriented fibers align.

The substrate 2503 with the oriented fibers 2501 dispersed and stacked thereon is vibrated with the vibration unit 2502. There are no particular limitation on the vibration unit used. The vibration unit can be a combination of a motor and a mechanism that transfers the rotary motion of the motor to the vertical motion and transmits the vertical motion to the substrate, a combination of a motor having an eccentric load on the shaft, an acoustic oscillator and/or an ultrasonic wave oscillator, and a transmitter, or the like. The conditions such as the frequency of the vibration, whether the vibration is periodic or non-periodic, and the time of vibration differ according to the shape and size of the substrate and the length and amount of the fibers. Thus previous investigations may be conducted to determine the optimum conditions.

The method of applying vibration as the external force in step F described above is suitable for cases in which the oriented fibers prepared in step E are long, i.e., about 1 mm to 10 cm in length. According to this method, although the shape of the substrate is slightly irregular, it is possible to construct production equipment by providing only the vibration unit for the substrate and fibers can be aligned in a significantly short amount of time. Thus, a uniaxially aligned fiber group can be produced at high production throughput and low equipment cost. Since the substrate does not come into contact with the mechanism configured to conduct alignment, the possibility of contamination during the process of making the oriented structure is significantly low, and high yields can be achieved.

This method may be modified by allowing the oriented fibers to float on the surface of a liquid medium that does not dissolve the polymer and then generating waves in the liquid medium to apply vibration to the fibers.

Figure 8A:
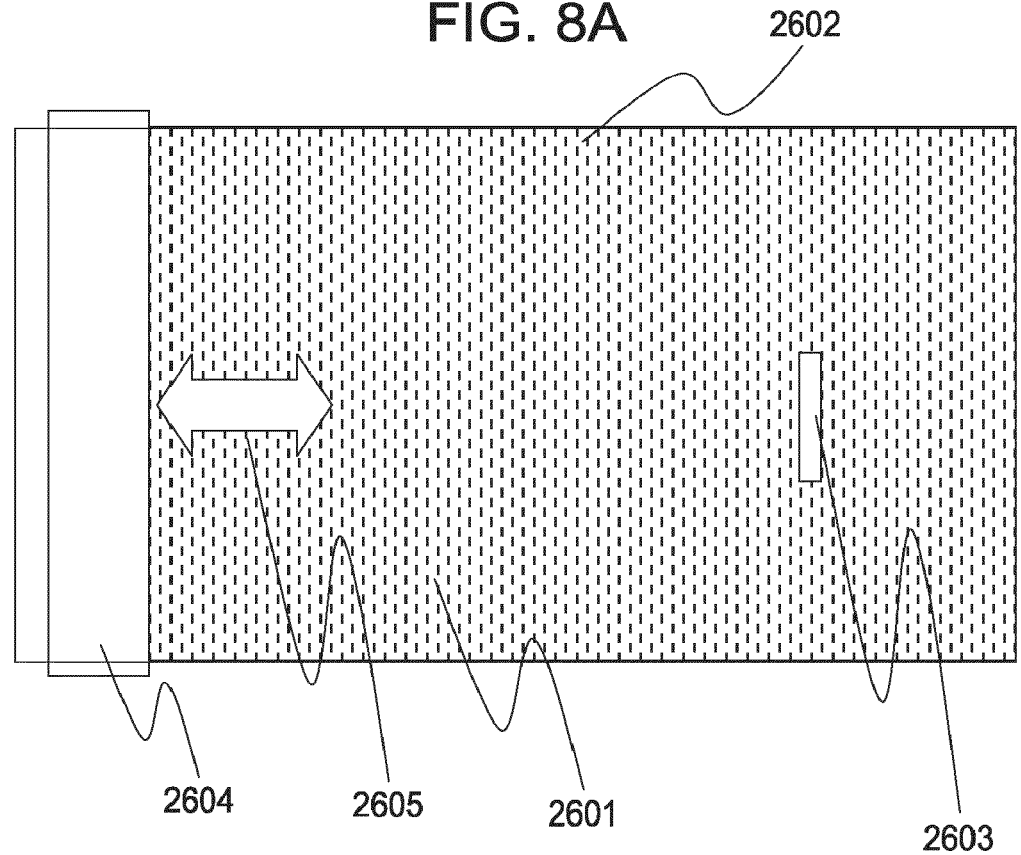
FIGS. 8A and 8B are schematic diagrams showing alignment of oriented fibers by surface development.
Figure 8B:
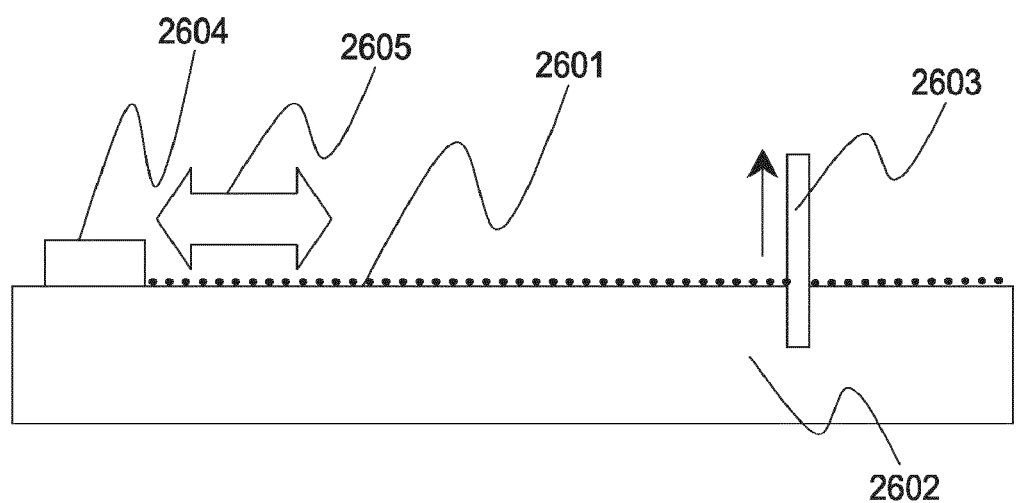

FIGS. 8A and 8B are schematic diagrams showing alignment of the oriented fibers by surface development.

As shown in FIGS. 8A and 8B, oriented fibers 2601 are dispersed in the liquid surface of a vessel 2602 filled with a liquid medium. A substrate 2603 that can move in the vertical direction with respect to the surface of the vessel 2602 is inserted, and a barrier 2604 that can move in the surface direction (direction indicated by the arrow 2605) is installed on at least one end of the vessel 2602. When the substrate 2603 and the barrier 2604 are viewed from above the vessel 2602, the line along which the substrate 2603 contacts the liquid surface is parallel to the line along which the barrier 2604 contacts the liquid surface.

Next, while the barrier 2604 is being reciprocally moved along the direction of the arrow 2605 and/or the substrate 2603 is being moved up and down to create ripples, the liquid surface onto which the fibers are dispersed, is gradually narrowed. This motion causes the fibers to align parallel to the line along which the barrier 2604 is in contact with the liquid surface. After the liquid surface on which the fibers are dispersed is narrowed and the density of fibers therein reaches a particular level, either the substrate 2603 is inserted and pulled up or the substrate 2603 previously inserted in the liquid is pulled up. By this operation, aligned fibers are transferred on both sides of the substrate.

Alternatively, after the oriented fibers on the liquid surface are aligned by the horizontal reciprocal motion of the barrier 2604, a substrate (not shown) parallel to the liquid surface may be gradually moved down while maintaining the parallel positional relationship to allow the substrate to come into contact with the liquid surface, thereby transferring the fibers on the liquid surface onto the substrate.

According to this modified method that uses vibration as the external force in step F, a flat substrate can be used. Unlike the aforementioned typical vibration method where the fibers floating on the medium surface are vibrated, the possibility of contamination is higher with the modified method. However, the modified method still achieves other advantages.

Flow-Induced Uniaxial Alignment of Oriented Fibers

The case of using a flow of a medium as the external force in step F will now be described in further detail.

According to the method for uniaxially aligning the oriented fibers by using a flow of a medium as the external force, a material having two-dimensional anisotropy, such as a material having a string shape or a bar shape, is suspended in a liquid that does not dissolve the material and/or a gaseous medium, the suspension is dropped onto the substrate, and the medium is allowed to flow in a particular direction. In this manner, the material with shape anisotropy aligns in the uniaxial direction while slight friction remains between the material and the substrate surface.

The method for uniaxially aligning the oriented fibers using a flow of a medium will now be described in further detail.

Figure 9:
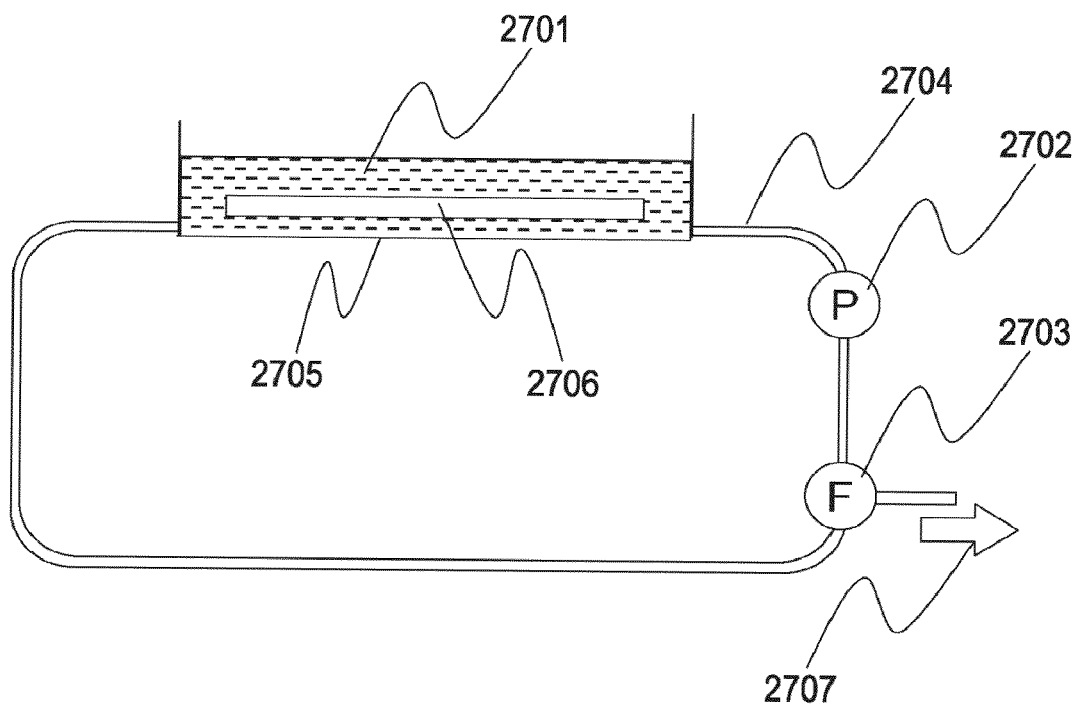
FIG. 9 is a schematic diagram showing flow-induced alignment of oriented fibers.

FIG. 9 is a schematic diagram showing flow-induced alignment of the oriented fibers.

First, the oriented fibers prepared in step E are dispersed on the substrate. The substrate may be any substrate insoluble in the medium, and an adequate substrate may be used as needed. As shown in FIG. 9, a medium 2701, wherein the oriented fibers prepared in step E are suspended, is charged in a substrate-accommodating vessel 2705. The substrate-accommodating vessel 2705 is connected to a medium-circulating unit 2702 and a medium removing unit 2703 through a pipe 2704. A substrate 2706 is immersed in the medium 2701 in the substrate-accommodating vessel 2705. The substrate 2706 may be any substrate insoluble in the medium 2701 and a suitable substrate may be used as needed. There are no particular limitations also on the medium and a medium having a specific density equal to or smaller than that of the oriented fibers can be used.

The medium is then circulated by the medium circulating unit 2702. There are no particular limitations on the medium circulating unit 2702 and it can be, for example, a pump or screw propeller with a diaphragm. Since a pump often causes pulsating flow or turbulent flow of the medium, a unit for suppressing the pulsating component of the medium flow, such as an air chamber, can be provided downstream of the medium circulating unit 2702. A unit that straightens the flow of the medium, such as a flow-straightening plate, can also be provided at the upstream side of the substrate 2706 in the substrate-accommodating vessel 2705. While the medium 2701 with suspended oriented fibers is circulated, the medium 2701 is gradually removed by the medium removing unit 2703 and discharged from the circulation system as indicated by an arrow 2707. As a consequence, the density of the oriented fibers in the medium gradually increases, and the oriented fibers accumulate as they are uniaxially aligned along the direction of the medium flow on the substrate 2706. There are no particular limitations on the medium removing unit 2703 and it can be a combination of a filter that allows passage of the medium but not the oriented fibers and a mechanism that discharges only the filtered medium or it can be a mechanism that evaporates the medium. The conditions such as the flow rate of the medium, the time of the circulation, and the like differ depending on the shape and size of the substrate and the length and amount of the fibers. The optimum conditions may be determined on the basis of the investigations in advance.

When the orientated fibers made in step E are longer than the long side of the substrate and are not aligned in a straight manner, the substrate is vibrated to align the fibers dispersed and stacked on the substrate to yield substantially uniaxial alignment. Subsequently, one end of each fiber is fixed at an end of the substrate and the fibers are exposed to a flow. In this manner, the aligned fibers become straight and a continuous oriented structure with a high degree of orientation can be produced.

The method of using the flow of the medium as the external force in step F described above is suitable when the oriented fibers made in step E are long, i.e., 1 mm to 10 cm. The method is also effective in the case where the fibers become curved by nonuniform evaporation of the solvent inside the fibers after the fibers are made in step E. The method is particularly effective when the oriented fibers are curved because in step E, the fibers are stretched in a manner similar to spinning of synthetic fibers, recovered by winding on a wheel, and then cut to an adequate length suitable for step F.

Formation of a Continuous Oriented Structure by Dissolution

Formation of a continuous oriented structure by dissolution in step G will now be described in further detail.

If in step E the polymer is dissolved in a solvent to produce oriented fibers, the same solvent may be used to semi-dissolve the uniaxially oriented fibers prepared in step G and to thereby form a continuous oriented structure. During this process, if the oriented fibers are completely dissolved, the orientation of the molecules in the fibers becomes disturbed, and there is a risk that the degree of orientation of the resulting continuous oriented structure would decrease. Thus, the length of time the fibers are allowed to contact the solvent must be controlled such that the solvent only dissolves the surface portions and does not penetrate inside the fibers, thereby maintaining the inside of the fibers in a solid state. This length of time differs according to the type of the polymer and the solvent and may be determined in advance on the basis of investigations. If the solvent is rapidly evaporated from the semi-dissolved fibers absorbing the solvent, then there is a risk that the orientation of the molecules in the portions where the fibers bond to each other by foaming of the solvent becomes disturbed and the degree of orientation of the resulting oriented structure is decreased. Accordingly, it is important to expose the oriented fibers to a several ppm-order solvent vapor for a predetermine time to yield a semi-dissolve state and then gradually remove the solvent vapor or gradually substitute the solvent vapor with air over about 1 hour. The optimum values of concentration, time, and the like differ according to the type of the polymer and the solvent, the amount and size of the single crystals, and the like. These values may be appropriately determined in advance on the basis of investigations.

According to the above-described method for making a continuous oriented structure by dissolving only the surfaces of the fibers in step G, the polymer can be formed into a homogeneous and continuous oriented structure on the molecular level. Moreover, if the same solvent as in step E is used, the behavior of the oriented fibers can be easily predicted, and various conditions for the step can be determined easily.

Formation of a Continuous Oriented Structure by Melting

Fabrication of a continuous oriented structure by melting in step G will now be described in further detail.

If, in step E, the oriented fibers are made by heating and melting the polymer, the uniaxially oriented fibers made in step G may be similarly heated to yield a semi-melted state (only the surfaces of the individual fibers are in a molten state) to from a continuous oriented structure. During this process, if the oriented fibers are completely melted, then there is a risk that the oriented molecules inside the fibers are disturbed and the degree of orientation after fabrication of the oriented structure is decreased. Thus, it is necessary to control the length of time and method of heating such that only the surfaces of the fibers are melted and that the interiors of the crystals are maintained in a solid state. It is also important to control the rate of heating the oriented fibers to a moderate level of about 1 to 2° C./min and make the temperature constant before it reaches a temperature close to the lower of the melting temperature and the glass transition temperature. The optimum rate of temperature elevation and the time of heating differ according to the size and amount of the polymer and the oriented fibers and may be determined in advance on the basis of investigations.

According to the above-described method for making the continuous oriented structure by melting in step G, the polymer can be formed into a continuous oriented structure, having molecular-level homogeneity. Moreover, since the method requires only to place the substrate in a heating unit, the equipment for step G can be incorporated in the equipment of step F so that the step G can be easily performed after step F while applying the external force.

In forming a continuous oriented structure by dissolving or melting only the surfaces of the fibers, a thinner continuous oriented structure with higher homogeneity can be formed by compressing the uniaxially oriented fibers with a press machine or the like if the molecular structure and/or the stereostructure of the polymer is of a type that does not deform under pressure or the like. However, during this step, if the oriented structure is spread as a result of thickness reduction by compression, then the oriented molecules in the fibers may be disturbed and the degree of orientation of the resulting oriented structure may decrease. Thus, it is important that a die for a press machine that allows elongation of the object only in the uniaxial direction during compression must be prepared and the compression is conducted by arranging the axial direction of the die to be parallel to the orientation of the oriented fibers. Optimum values for pressure and time differ depending on the thickness and amount of the oriented fibers and may be determined in advance on the basis of investigations.

Formation of a Continuous Oriented Structure by Affixing

Fabrication of a continuous oriented structure by affixing the uniaxially aligned fiber group in step G will now be described in further detail.

There are two methods for affixing. One is to bond or wrap (laminate-pack) the uniaxially aligned oriented fibers on or with a sheet having an adhesive on one side. The uniaxially aligned fiber group on the substrate in step F may be affixed together with the substrate.

The other method is to bury the uniaxially aligned oriented fibers in a resin or the like and solidify the resin. In step F, the technique of suspending the fibers in a medium to decrease the friction between the substrate and fibers has been described. In this step, a fluid material containing a polymerizable monomers such as acrylate and a polymerization initiator such as benzoyl peroxide, a fluid material such as UV-curable resin that solidifies in response to external stimuli, or a fluid material that has a melting point significantly lower than that of the polymer may be used as this medium. The uniaxially aligned fibers can be affixed together with the medium by stimulating or cooling the fluid material after the oriented fibers are aligned.

In employing these techniques, the sheet or medium used as a substrate for affixing may be any unoriented material that passes light of a required wavelength if the device incorporating the continuous oriented structure is a polarization/deflection filter. For example, a mixture of methyl methacrylate and benzoyl peroxide may be used as the medium and heated to 50° C. after aligning the oriented fibers. Another example process is to use a mixture of polyurethane acrylate and benzophenone as the medium and to irradiate the medium with UV light after the oriented fibers are aligned.

According to the above-described step G of forming a continuous oriented structure by affixation and/or solidification, the oriented fibers can be easily formed into a continuous oriented structure while maintaining a high degree of orientation.

Third Embodiment

A third embodiment will now be described in detail.

The principle behind the third embodiment is as follows. A helical substituted polyacetylene is a semiconductor/good conductor organic polymer material having string- or rod-shaped molecules and readily dissolves in a solvent such as chloroform. This helical substituted polyacetylene can form a columnar structure by self-assembly in which the molecules are densely integrated while being oriented in the same direction. Thus, as the solvent evaporates from the solution of the helical substituted polyacetylene and the concentration of the helical substituted polyacetylene increases, the molecules do not merely aggregate at random, but form a molecular flux in which the molecules oriented in the same direction are bonded to each other.

As the solvent evaporates, a molecular flux is formed inside a droplet of the helical substituted polyacetylene dropped on the substrate as described above. Meanwhile, molecules and the molecular flux in an oriented state precipitate on the substrate as the solvent evaporates. It is presumed that molecules and the molecular flux become oriented in the longitudinal direction of the linear droplet in all parts except for microregions in which the solution remains and the solvent flows in a complex manner. The droplet may have a shape other than a straight line. If the droplet has a pointed portion, however, the continuity of the orientation direction may be degraded in the pointed portion. The droplet may be formed as a curved or undulating line. In such a case, the assembly of the polymer can orient continuously with its vector matching with the longitudinal direction of the curve or undulating line.

Flow-induced orientation will now be described again. In general, flow-induced orientation is one of the techniques for orienting a material having two-dimensional anisotropy, such as a string- or rod-shaped material. This technique involves suspending a string- or rod-shaped material in a liquid or gaseous medium and allowing the medium to flow in a predetermined direction by a suitable mechanism so that the material with shape anisotropy aligns in the direction generating the minimum resistance. In the third embodiment, a droplet is simply placed on a substrate and this technique is different from the flow-induced orientation technique that requires a step of generating a flow in the liquid or a mechanism for moving the liquid. According to the third embodiment, as the solvent in the linear droplet on the substrate evaporates, the molecules become aligned and the entire linear polymer assembly forms a linear oriented structure once the solvent is completely evaporated.

In view of the above, when a linear droplet having a particular aspect ratio (length/width) is applied on the substrate with a predetermined flatness, the helical substituted polyacetylene forms a molecular flux as the solvent evaporates. The molecules and the molecular flux align in the same direction as the longitudinal direction of the droplet due to the influence of the linear droplet. After the solvent is completely evaporated, a solid oriented material with a high degree of orientation and a high density is obtained.

A method for making a continuous oriented structure of the polymer and a device incorporating the continuous oriented structure includes the two steps, H and I, below. The polymer used in this method and each of the steps is described below.

Helical Substituted Polyacetylene

First, the principle of the helical substituted polyacetylene essential for the third embodiment is schematically described below.

The solubility of the helical substituted polyacetylene can be controlled by controlling the side chain structure and thus the helical substituted polyacetylene can be used as a soluble conductive polymer material. Examples of the side chain structure that imparts solubility include linear or branched alkyl groups and the like. Since the helical structure is constituted from alternating double bonds of the polyacetylene main chains, the helical substituted polyacetylene is rod-shaped and has a high stiffness. Thus, it can be used as a conductive molecular wire.

In this embodiment, the conductive molecular wire is covered with nonconjugated functional groups functioning as insulating structures, and thus the electrical contact between molecules is controlled. Therefore, the wire functions as a coated conductive molecular wire and can be used as a wiring material for molecular devices. Moreover, in this embodiment, the conductive molecular wire can be monomolecular or can take a bulk structure such as a molecular flux structure or a thin film in which several molecules are assembled.

Figure 10:
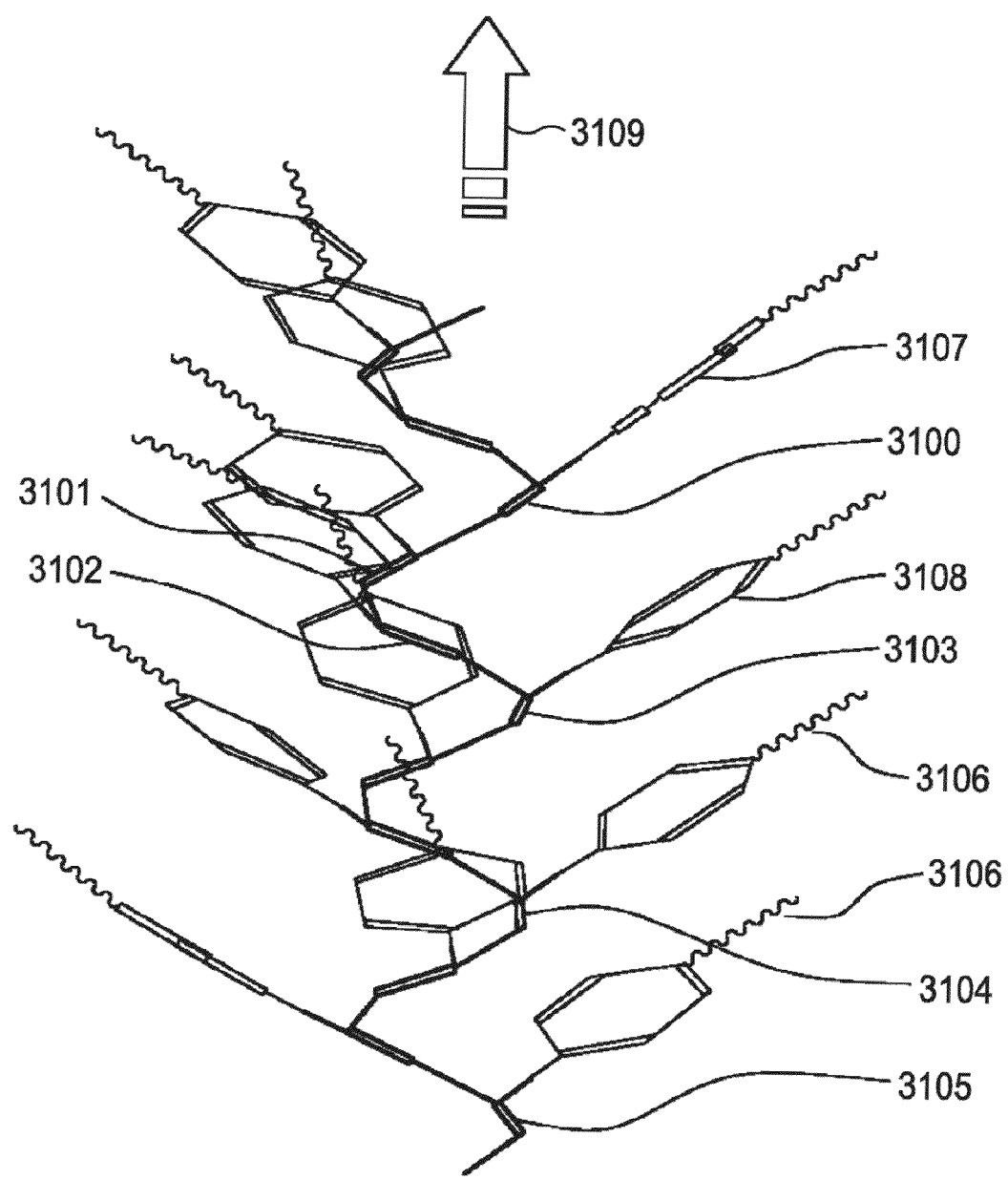
FIG. 10 is a structural diagram showing an example of a structure of a helical substituted polyacetylene.

The helical substituted polyacetylene synthesized by a Rh complex catalyst forms a pseudohexagonal structure. As shown in FIG. 10, the polyacetylene main chain has a helical structure with twisted alternating double bonds of a cis-transoid structure. Its helical structure is similar to a 3/1 helix in which one turn is constituted from three double-bond units, 3100, 3101, and 3102 (refer to Macromol. Chem. Phys., 203, pp. 66 to 70, 2002).

In this embodiment, a helical substituted polyacetylene is defined a substituted polyacetylene that has a helical main chain and maintains its helical structure over a long distance. The period of the helix of the helical substituted polyacetylene in the main chain direction is constant over a long distance; thus, the helical substituted polyacetylene is expected to exhibit electrical conductivity. Since the helical substituted polyacetylene exhibits great anisotropy of conductivity in the main chain direction, it can be used as a molecular wire of a good conductor or a semiconductor having excellent solubility.

Although phenyl groups are contained in the side chains in FIG. 10, it is not essential that the helical substituted polyacetylene include monocyclic and/or polycyclic aromatic rings in the side chains.

The helical substituted polyacetylene can be used as a conductive material having a variety of structures including bulk, thin film, and molecular structures. The helical substituted polyacetylene, which is the conductive material of this embodiment, will now be described in further detail.

Examples of the structure of the substituted polyacetylene include a hydrocarbon group, an ether or a thioether group substituted with halogen or a hydrocarbon group, and a substituted or unsubstituted cyclic hydrocarbon. A nonconjugated substituent such as a nonconjugated heterocycle, a methylene oxide chain of any length, or an ethylene oxide chain may be included in the side chains.

There are no particular limitations on the structure of the substituted polyacetylene. For example, the substituted polyacetylene can have the following structure:

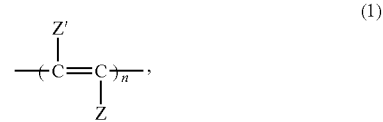

wherein Z represents a linear or cyclic hydrocarbon or a substituent containing a heteroatom or a metal atom. Examples of Z include a phenyl group, a methyl phenyl group, a methoxy phenyl group, an ethyl ester group, an ethyl group, and a cyclohexyl group.

In the formula, Z' may be the same as Z or a hydrogen atom, and n is an integer between 1 and 20.

The helical substituted polyacetylene is synthesized from an acetylene compound in the presence of a transition metal complex as a catalyst by commonly known methods (e.g., refer to Nanoletters, 2, pp. 877 to 880, (2002)).

Examples of the transition metal complex include rhodium compounds such as a rhodium(norbornadiene) chloride dimer ([Rh(NBD)Cl]$_2$) and a rhodium(cyclooctadiene) chloride dimer ([Rh(COD)Cl]$_2$). COD denotes cyclooctadiene and NBD denotes norbornadiene. In particular, [Rh(NBD)Cl]$_2$ may be used. Examples of the cocatalyst include amine, lithium compounds, and phosphorus compounds. In particular, triethyl amine can be used. Not only the dimers of rhodium complexes, but also monomers thereof, such as Rh[C(C$_6$H$_5$)=C(C$_6$H$_5$)$_2$](NBD)((C$_6$H$_5$)$_3$P) may be used. Examples of the solvent include nonpolar solvents such as chloroform and tetrahydrofuran and polar solvents such as ethyl alcohol, triethylamine, dimethylformamide, and water. In particular, chloroform, ethyl alcohol, or triethylamine can be used. These solvents may be used alone or in combination.

Possible higher-order structures are bulks and thin films. It is essential to form a defect-free helical structure in a long period for the synthesis of the helical substituted polyacetylene. It is not essential to form an aggregated structure. Thus, the helical substituted polyacetylene structure can be used as a monomolecular conductive molecular wire having anisotropy of electrical conduction in the main chain direction. Moreover, since the electrical contact between the molecules is suppressed by the insulating coating layers, the structure can be used as a good conductor- or semiconductor-molecular wire. The polymeric good conductor and/or semiconductor material of this embodiment is produced as follows. First, a solution in an organic solvent such as chloroform or tetrahydrofuran is prepared and applied on metal electrodes composed of gold, platinum, or the like formed on a silicon substrate, for example, by patterning. In this manner the helical substituted polyacetylene can be used as a thin film polymeric material composed of a good conductor and/or a semiconductor.

The length of the helical substituted polyacetylene of this embodiment is usually about several nanometers to several micrometers and can be changed by controlling the degree of polymerization. Nanoelectrodes having a gap of several nanometers to several hundred nanometers can be fabricated by, for example, patterning a gold thin film deposited on a silicon substrate by a technique such as focused ion beam (FIB). By applying the helical substituted polyacetylene longer than the interelectrode distance on the nanoelectrodes, a structure in which the nanoelectrodes are connected to each other through the helical substituted polyacetylene can be formed. According to the conduction mechanism of this electrode structure, the electrodes are bridged with a single molecule, and the carrier migration caused by hopping between the molecules is suppressed, thereby increasing the mobility of the conduction carrier.

Step H: Step of Applying a Helical Substituted Polyacetylene Solution on a Substrate in a Linear Manner The solvent that dissolves the helical substituted polyacetylene described above may be any solvent that dissolves the helical substituted polyacetylene but does not dissolve and/or denaturalize the devise substrate and the droplet-applying unit described below. Various types of helical substituted polyacetylene can be made by controlling the substituents. For example, chloroform is advantageous in that it can dissolve most types of helical substituted polyacetylene and has a high volatility at normal temperature. Thus, the mechanism for controlling the rate of solvent evaporation in the step I described below can be simplified or omitted with chloroform. If the evaporation rate needs to be decreased, toluene, THF, or the like having low volatility can be used. When methyl alcohol is used as the solvent, it does not dissolve as many different types of helical substituted polyacetylene as chloroform. However, methyl alcohol can be handled easily and is inexpensive. Moreover, since there are many types of plastic that dissolves in chloroform but not in methyl alcohol, the range of selecting the material of the substrate can be widened. When a helical substituted polyacetylene imparted with water-solubility by incorporation of an ionizing group, such as $-NH_4^+Cl^-$, in a substituent is used, pure water or other aqueous solvents may be used as the solvent. In such a case, the treatment of the waste liquid and exhaust gas can be simplified or omitted compared to the case in which an organic solvent is used. Moreover, as described below, in order to apply a polyacetylene solution in this solvent on a substrate into a predetermined shape, the solution must maintain the predetermined shape on the substrate. Thus, a thickener or the like may be added to the solution to increase the viscosity to an extent that does not adversely affect the solution applying step described below.

The above-described solvent is used to dissolve a solid helical substituted polyacetylene to prepare a solution. The solution may be filtered through a filter with apertures of 1 μm or less to remove the undissolved components in the solution. In this manner, the homogeneity of the linear oriented structures formed on the substrate can be further improved.

The substrate used for forming a device may be any substrate composed of or coated with a material that does not dissolve and/or denaturalize in the solvent in step H. However, as described below, the solution applied on the substrate must retain a linear shape. Thus, a substrate that forms a contact angle of less than 10° with a solvent droplet dropped on the substrate, thereby allowing the solvent to flow out, should be avoided. For example, when the solvent is water, a substrate subjected to ultra hydrophilization should be avoided. Moreover, when the solvent is water, the substrate surface may be subjected to treatment that increases the contact angle of the droplet to the substrate to 10° or more, such as water repellency-imparting treatment.

In this embodiment, molecules of the helical substituted polyacetylene become highly oriented by the flow of the solution droplet induced by evaporation of the solvent. Thus, the substrate surface should be as flat and uniform as possible. The height of the droplet can be as high as greater than 1 mm. A step difference of 1 μm or less is sometimes created between the substrate surface onto which the electrodes are formed and the electrode surface. Although the orientation direction of the helical substituted polyacetylene molecules may be locally disturbed near the step difference, the disturbance is not significant as a whole. The recessed portions around the electrode region may be filled with a nonconductive material so that the difference in height between the conductive region and the nonconductive region is eliminated.

The linear shape of the applied droplet will now be described in detail. In determining the shape, the absolute values of the length and width of the line and the aspect ratio must be carefully determined since the orientation is induced by the flow of the liquid in the droplet as described above.

First, with respect to the absolute value of the width, since a droplet also shrinks in the axis direction as described above, an excessively large width will create a significantly large portion in which the molecules are oriented perpendicular to the axis direction (perpendicular to the longitudinal direction) due to the shrinkage of the droplet in the axis direction caused by solvent evaporation. Thus, in the assembly of the polymer molecules obtained after the solvent is completely evaporated, the molecules are not uniformly aligned in the longitudinal direction and the molecules in the peripheral portions orient perpendicular to the axis direction (longitudinal direction) while the molecules in the central portion orient in the longitudinal direction, thus creating a complex oriented structure. Such a structure rarely achieves the required performance. On the basis of this understanding, the present inventors have repeated experiments and have found that a uniformly oriented polymer assembly can be obtained after solvent evaporation when the width of the droplet is about 5 mm or less or preferably, about 2 mm or less, although this may vary according to the viscosity of the droplet and the interaction between the droplet and the substrate.

The aspect ratio is described next. At an aspect ratio of about 1, the orientation direction is not specified. When the aspect ratio exceeds 1 but is not sufficiently large, the molecules do not sufficiently orient in the intended uniaxial direction and the resulting polymer assembly may exhibit a significantly low degree of orientation or the orientation direction may meander. The inventors have repeated experiments on the basis of this understanding and found that a satisfactory oriented structure can be obtained at an aspect ratio of about 2 or more, in particular, about 5 or more.

There are no particular limitations on the technique of applying the helical substituted polyacetylene solution prepared in step H on a substrate in a linear manner. An example of the technique is a drawing technique in which a narrow tube is moved on a substrate while the solution is discharged from the aperture of the narrow tube or in which one end of a brush, stylus, or sponge impregnated with the solution is moved on the substrate. In such a drawing technique, the aperture of the fine tube or the like and the end of the brush or the like are referred to as "pen tip" hereinafter. Examples of other techniques of applying the helical substituted polyacetylene solution include a printing technique in which the solution is transferred on a substrate by using a plate having a pattern for application of the solution and an ink jet technique in which fine droplets of the solution are ejected onto a predetermined portion on the substrate.

Figure 11:
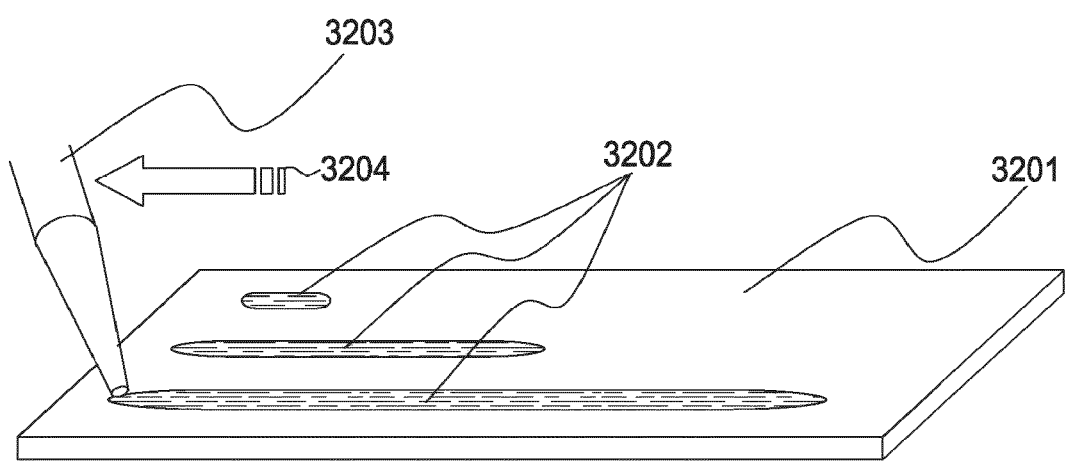
FIG. 11 is a schematic diagram showing a method for making a device by a drawing technique.

The drawing technique will now be described in detail. According to this technique, a container or cylinder charged with the solution may be used as a continuous solution supply unit functioning as a pen for drawing. In such a case, as shown in FIG. 11, the aperture of the narrow tube such as an injection needle or a pipette tip connected to a container or a cylinder serves as a pen tip 3203, and droplets 3202 of intended linear shapes are formed by moving the pen on the substrate while supplying the solution from the pen tip 3203. There are no particular limitations on the mechanism for moving the pen and the pen tip. For example, human hands, an XY plotter, or a robot arm can be used.

According to this technique, only a pen having a pen tip commonly used is required. This technique is thus suitable for simple experimental production such as making several pieces of devices for the purpose of testing the pattern.

Figure 12A:
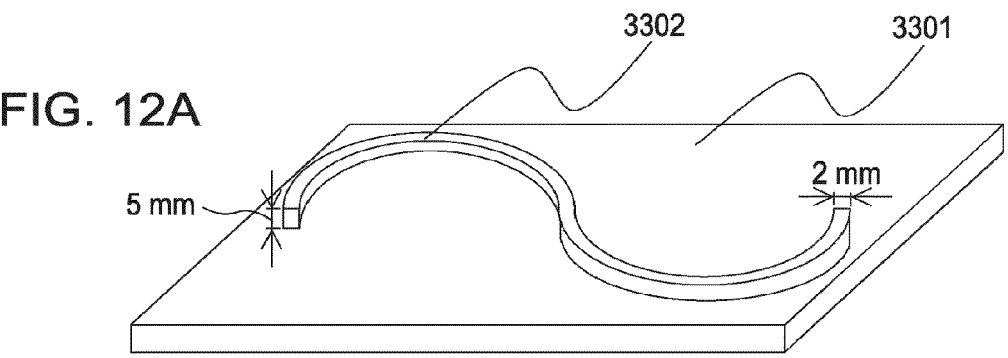
FIGS. 12A to 12E are process drawings showing a method for making a device by a printing technique.
Figure 12B:
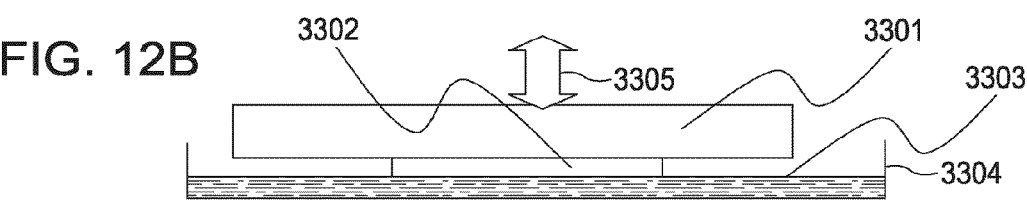
Figure 12C:
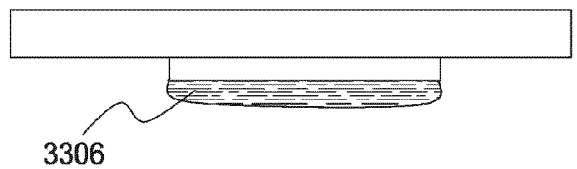
Figure 12D:
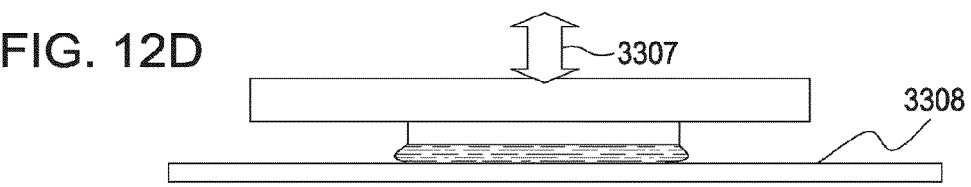
Figure 12E:

Next, the printing technique is described with reference to FIGS. 12A to 12E. As shown in FIG. 12A, a common plate for printing, such as an anastatic plate, an intaglio plate, a mimeograph (stencil), a flat plate, or the like can be used. A plate suitable for the size and degree of precision of the pattern to be produced may be used. The material of the plate may be any material that does hot dissolve and/or denaturalize in the solvent and can be a material commonly used in printing. When a flat plate is used and the solvent of the polyacetylene solution serving as an ink solution is a hydrophobic organic solvent, a hydrophobic portion having a shape of a mirror image of the shape to be formed may be formed on a hydrophilic substrate surface. Except for the cases involving a mimeograph (stencil), the plate is immersed in a polyacetylene solution 3303 as shown in FIG. 12B, and then a polyacetylene solution 3306 is allowed to adhere on a part of the plate as shown in FIG. 12C (since the plate used is an anastatic plate in FIGS. 12A to 12D, the solution adheres on a projecting portion 3302). The plate is then contacted with a substrate 3308 for making a device, as shown in FIG. 12D, and a polyacetylene solution droplet 3309 having the intended shape is finally transferred onto the substrate 3308, as shown in FIG. 12E. In the case where the mimeograph is used, the plate is superimposed on a substrate for forming a device, and the polyacetylene solution serving as an ink solution is poured from above. The ink solution on the mimeograph may be spread with a spatula, a roller, or the like to make the droplet applied on the substrate more uniform.

According to the printing technique, a plate must be formed. Thus, the printing technique is suitable for mass production of a single device at low cost and high throughput.

Figure 13:
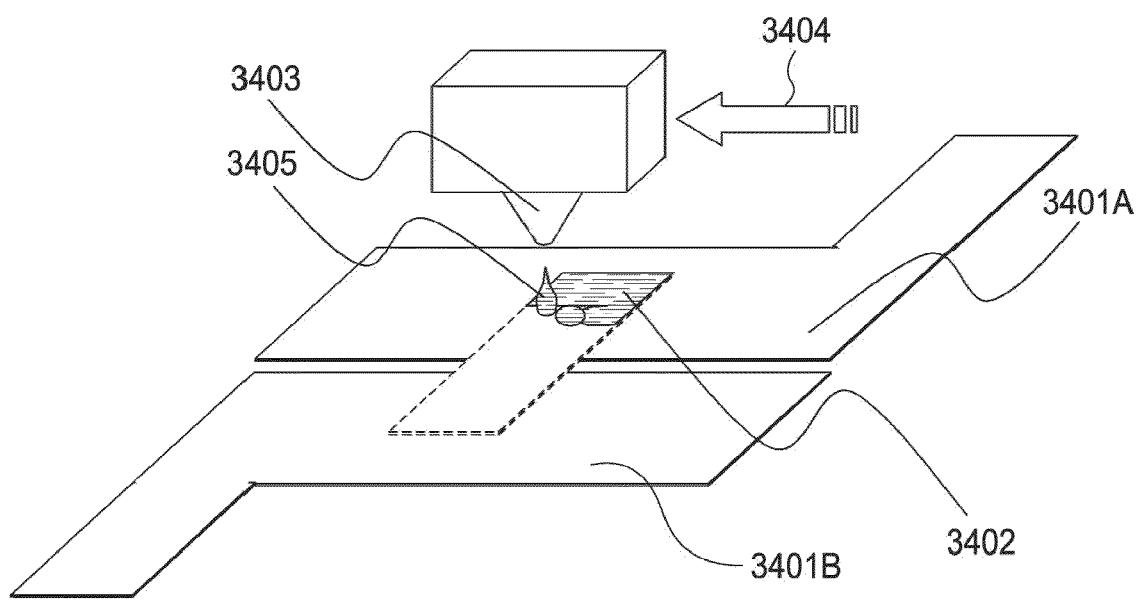
FIG. 13 is a schematic diagram showing a method for making a device by an ink jet technique.

The ink jet technique will now be described. According to this technique, an ink nozzle 3403 of an ink jet printer controlled by a controller (not shown) such as a personal computer or the like is raster-scanned in the direction of an arrow 3404, as shown in FIG. 13. Microdroplets 3405 of the polyacetylene solution are ejected as needed onto microgap electrodes 3401A and 3401B on the substrate. The droplets 3405 are integrated on the substrate to form a droplet 3402, which is the shape of the droplet originally intended. There are no particular limitations on the technique of ejecting the solution from the ink nozzle. Examples of the technique for ejecting the solution include a technique of mechanically ejecting the solution and a technique of heating the solution with a small heater to form solution bubbles and then using the drive force generated by the volume increase caused by such bubbles. In order to form an elaborative shape, the amount of ink microdroplets ejected each time from the ink nozzle must be reduced. However, if the amount is excessively decreased, the required amount of polyacetylene per unit area cannot be supplied to the substrate. In such a case, ink microdroplets may be discharged several times onto the same place. In FIG. 13, the ink nozzle 3403 is raster-scanned. However, the throughput sometimes improves by conducting vector scanning of the ink nozzle 3403 of tracing the shape depending on the desired shape of the droplet. A scanning method suitable for the case should be selected.

The ink jet technique is suitable for forming an elaborate pattern. The ink jet technique can comply with a wide range of processes including experimental production of trying a pattern shape and mass production if a high-performance ink jet printer is used.

The shape of the droplet to be formed must be linear. In the case where the drawing technique or the ink jet technique is used, it is not necessary to draw one line by one motion of the pen tip or the ink jet nozzle. While the solvent remains unevaporated on the substrate, a particular area may be traced using a pen tip or an ink jet nozzle so that an integrated linear droplet is ultimately formed. It is not necessary to align the direction of the movement of the pen tip or the ink jet nozzle to the direction of the axis direction of the linear droplet to be produced. Furthermore, in the drawing technique and the ink jet technique, a plurality of pen tips or ink jet nozzles may be prepared so that the droplets can be applied to a plurality of areas in one operation. According to the printing technique, a plurality of plates may be prepared to conduct sequential transfer on the substrate so that a droplet can be ultimately formed by a combination of the patterns on the plates.

The amount of the helical substituted polyacetylene in the oriented structure to be produced is determined on the basis of the concentration of the droplet applied. The optimum amount of application also depends on the viscosity and surface tension of the solution which are presumably determined by the type of side chains of the helical substituted polyacetylene, the type of solvent, the concentration, the temperature, and the like. The amount of droplets that can be supplied on the substrate per unit area also changes with the contact angle which changes according to the affinity between the substrate and the solution. Thus, investigations may be conducted in advance to determine the optimum amount of droplet applied on the basis of the characteristics of the device to be made. Here, the amount of droplet is actually controlled by controlling the rate of discharging the solution from the pen tip or the rate of moving the pen tip in the drawing technique, by controlling the shape and material of the anastatic plate or the like in the printing technique, and by controlling the rate of discharging the solution from the nozzle or the rate of moving the nozzle in the ink jet technique.

With regards to the determination of the amount of application described above, various factors are involved in determining the width of the oriented structure relative to the width of the linear droplet applied on the substrate and how much gap is needed at minimum in applying a plurality of linear droplets in a parallel manner at narrow intervals. Thus, investigations may be conducted in advance to determine the optimum values therefor.

Step I: Step of Evaporating the Solvent in the Solution

After the droplet having the intended shape is formed on the substrate as described above, the droplet is dried in the solvent-evaporating step.

As described above, the molecules of the helical substituted polyacetylene become highly oriented as the evaporating solvent creates a flow in the liquid of the droplet. Thus, the degree of orientation of the molecules, i.e., the performance of the helical substituted polyacetylene assembly formed on the substrate, is dependent on the rate of evaporation. The optimum rate changes with the viscosity of the solution and the type of substrate and may be determined on the basis of previous investigations.

The evaporation step may be conducted by any technique as long as the evaporation time is taken into account. For example, it has been found that when a volatile solvent such as chloroform is used, the solvent completely evaporates in about 10 minutes at room temperature, thereby giving a satisfactorily oriented structure such that a special unit for controlling evaporation is not necessary. In the cases where a solvent having a high or low boiling point is used, the rate of solvent evaporation may be adequately controlled by placing the substrate on a stage or in a container whose temperature can be controlled and/or by placing the substrate in an airtight container whose internal pressure and the partial pressure of the evaporated solvent can be controlled. During this process, it is necessary to pay particular attention not to boil the solution by heating and/or vacuuming to avoid creating unintended liquid flow by the bubbles.

A homogeneous polymer assembly is rarely produced and the orientation in the intended direction is rarely achieved if the liquid moves due to a factor other than the evaporation of the solvent, such as if the substrate is shaken or excessively inclined in one direction or if air or the like moves on the substrate surface in the direction parallel to the substrate. Thus, the evaporation step can be conducted by placing the substrate in an environment or an apparatus with less vibration, inclination, or air flow.

EXAMPLES

The invention will now be described by way of examples which in no way limit the scope of the present invention.

Example 1

In this example, a polyacetylene continuous oriented structure was formed by employing a magnetic field orienting method in step C and the dissolution method in step D.

A substituted polyacetylene having a phenyl group substituted in the para position with an N-octyl amide group as shown in formula (2) below, was prepared as the polymer. This substituted polyacetylene easily dissolves in chloroform but does not dissolve in methyl alcohol.

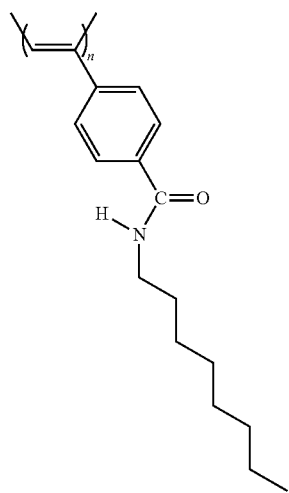

(2)

On a square quartz glass plate with sides of about 1.8 cm, 10 mg of yellow powder of this polyacetylene was dispersed.

To a glass petri dish with an inner volume of about 13 mL, 0.5 mL of chloroform was added. A 5 mm glass cube was placed on the bottom, and the quartz glass plate with the polyacetylene powder dispersed thereon was placed on a surface of the glass cube. Then the glass petri dish was covered with a lid. In this state, the oriented crystals on the surface of the quartz glass surface did not come into contact with the chloroform solution, but was exposed to chloroform vapor at a concentration of about 5 ppm. The petri dish was allowed to stand in this state at room temperature for about 1 hour. As a result, the powder on the surface of the quartz glass plate turned blackish.

The quartz glass was observed with a microscope. The diameter of each particle was about 500 μm to 2 mm. A rotary stage of a polarizing microscope was rotated while the visual field was darkened by a polarizer and an analyzer in a cross-Nicol configuration. Under microscopic observation, different portions of the same particle glow red as the stage was rotated, indicating that the particle was a polycrystalline structure constituted from microcrystals oriented in various directions.

Next, powder of this polyacetylene polycrystal was mixed with about 0.5 mL of methyl alcohol in a test tube. Into the resulting mixture, a horn of an ultrasonic homogenizer with an output of 20 W was inserted, and the powder was pulverized for 5 minutes in a 1 sec ON-1 sec OFF cycle to prepare a suspension of the pulverized polyacetylene powder. A portion of the suspension was sampled and observed with a microscope. The diameter of each microparticle was about 1 μm to 20 μm. When the particles were observed on a rotating stage of a polarizing microscope, the entirety of each microparticle shined red at a predetermined direction. Thus it was found that each microparticle was a pulverized single microcrystal oriented in one direction.

On a square quartz glass plate with sides of about 1.8 cm, the polyacetylene microcrystal suspension obtained as above was placed, and the quartz glass was arranged such that the surface was parallel to the lines of magnetic force and perpendicular to the gravitational force. The glass plate was then placed near the central portion of a chamber of a cryocooled superconducting magnet 705 (produced by Sumitomo Electric Industries, Ltd.) in which the magnitude of the magnetic field near the central portion was about 8 T. A magnetic field was generated with the superconducting magnet for about 1 hour. As a result, methyl alcohol on the substrate was completely evaporated and most of the particles on the quartz glass combined to form a crystal group. The quartz glass was observed on a rotary stage of a polarizing microscope. The entire face of the microcrystal group glowed red and stopped glowing every 45°. From this phenomenon, the entire face of the microcrystal group was assumed to be a uniaxially oriented single crystal group.

Next, to a glass petri dish with an inner volume of about 13 mL, 0.5 mL of chloroform was added. A 5 mm glass cube was placed on the bottom, and the quartz glass plate with the crystal group adhered thereon was placed on a surface of the glass cube. Then the glass petri dish was covered with a lid. In this state, the crystal group on the surface of the quartz glass surface did not come into contact with the chloroform solution, but was exposed to chloroform vapor at a concentration of about 5 ppm. The petri dish was allowed to stand in this state at room temperature for about 10 hours. As a result, the microparticles on the surface bonded to each other to form a single continuous oriented structure. The chloroform in the petri dish evaporated completely. The petri dish was opened and the quartz glass was taken out.

The quartz glass was observed on a rotary stage of a polarizing microscope. The entire face of the film glowed red and stopped glowing every 45°. The film surface was also observed with a microscope, and it was confirmed that the film was a completely integral single film, although there was some nonuniformity in thickness. The polarized absorption was measured with a spectrometer (Lambda 950 produced by PerkinElmer), and the dichroic ratio (D) at 320 nm was calculated. The dichroic ratio was 0.41. This confirmed that the entire face of the film formed a polarizing filter oriented in the uniaxial direction.

Comparative Example 1

The same polyacetylene powder as in Example 1 was dissolved in chloroform to prepare 0.5 mL of a 20.0 mg/mL solution. The solution was placed on a glass slide as in Example 1 and allowed to stand still in a chamber with a superconducting magnet producing a magnetic field of about 8 T for about 1 hour. Chloroform on the glass slide completely evaporated and a thin film of polyacetylene was formed. The glass slide was observed on a rotary stage of a polarizing microscope. The observation confirmed that the thin film did not have uniaxial orientation. The polarized absorption was measured with a spectrometer and the dichroic ratio (D) at 320 nm was calculated. The dichroic ratio was 0.02.

Example 2

In this example, a polyacetylene continuous oriented structure was made by employing a magnetic field orientation method in step C and the affixing method in step D.

A substituted polyacetylene having a phenyl group substituted at the para position with a hexyloxy group as shown in formula (3), was prepared as the polymer. This polymer easily dissolves in chloroform.

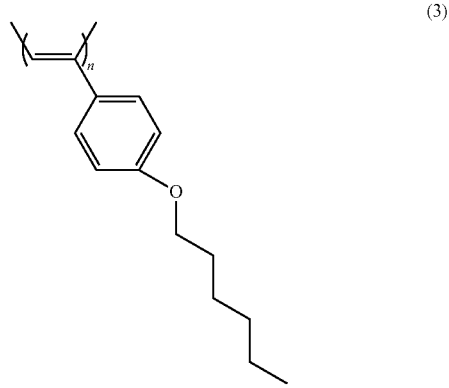

(3)

Yellow powder of this polyacetylene was dispersed on a quartz glass plate and exposed to chloroform vapor for about 1 hour as in Example 1. The powder on the surface of the quartz glass plate turned blackish.

The quartz glass was observed with a microscope and it was found that the powder had a polycrystalline structure substantially the same as that in Example 1.

This polyacetylene polycrystal powder was mixed with about 0.5 mL of a UV-curable resin (BeamSet® AQ-9C produced by Arakawa Chemical Industries Ltd.) solution in a test tube. Into the resulting mixture, a horn of an ultrasonic homogenizer with an output of 20 W was inserted, and the powder was pulverized for 5 minutes in a 1 sec ON-1 sec OFF cycle to prepare a suspension of the pulverized polyacetylene microcrystals.

On a square quartz glass plate with sides of about 1.8 cm, the polyacetylene microcrystal suspension obtained above was placed. The quartz glass was arranged such that its surface was parallel to the lines of magnetic force and perpendicular to the gravitational force. It was then placed near the central portion of a chamber of a cryocooled superconducting magnet 705 (produced by Sumitomo Electric Industries, Ltd.) in which the magnitude of the magnetic field near the central portion was about 8 T. A magnetic field was generated with the superconducting magnet for about 1 hour. Subsequently, the substrate was carefully removed from the chamber and irradiated with UV light having a peak wavelength of 365 nm. The suspension was cured in about 5 minutes.

Lastly, the quartz glass was observed on a rotary stage of a polarizing microscope. The entire face of the film glowed bright red and stopped glowing every 45°. The dichroic ratio (D) at 320 nm was calculated. The dichroic ratio was 0.28. This confirmed that the entire face was oriented in the uniaxial direction and formed a polarizing filter selectively transmitting red light.

Example 3

In this example, a continuous oriented structure composed of polyacetylene and phenylene vinylene was made by employing a magnetic field orientation method in step C and the affixing method in step D.

A substituted polyacetylene used in Example 2 and a dimer represented by formula (4) below containing two hydrogen-bonded oligo(p-phenylene vinylene) (referred to as "OPV dimer" hereinafter) were prepared as the polymer.

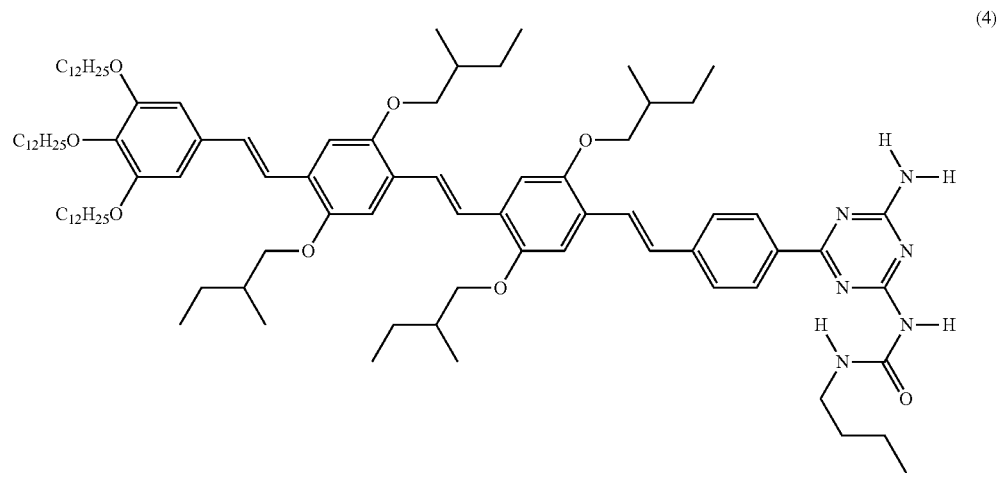

(4)

The polyacetylene was processed as in Example 2 into a' polycrystalline structure and pulverized to prepare a suspension of microcrystal powder.

Powder of the OPV dimer was placed on a quartz glass plate and melted by heating at 260° C. in a nitrogen atmosphere. The resulting melt was cooled to room temperature at a cooling rate of 2° C./min. The particles became fused and formed an integral film on the quartz glass plate. The quartz glass was observed under a microscope and the observation confirmed that the film had a polycrystalline structure. The film was separated from the quartz glass, mixed with a UV-curable resin as with the polyacetylene, and pulverized with an ultrasonic homogenizer to prepare a suspension of pulverized microcrystals. The suspension was placed on a quartz glass and observed under a microscope. The film was shattered into pieces, and all parts of each microparticle glowed yellow at a particular stage angle.

The two suspensions were mixed, and the resulting mixture was placed in a superconducting magnet chamber for about 1 hour and then irradiated with UV light to cure as in Example 2.

The quartz glass was observed on a rotary stage of a polarizing microscope. In the observation, the entire surface of the cured product glowed bright orange and stopped glowing every 45°. The transmittance of the cured portion of the quartz glass was measured with a spectrometer. It was found that the transmittances of two wavelengths, about 620 nm (red) and 590 nm (yellow), were high. The polarized absorption was measured and the dichroic ratio (D) at 320 nm was calculated. The dichroic ratio was 0.22. This confirmed that the entire face of the film was oriented in the uniaxial direction and formed a polarizing filter that selectively transmits red and yellow light.

Example 4

In this example, a polyacetylene continuous oriented structure was made by employing a stretching method in step E, a magnetic field orientation method in the step C, and the surface-dissolving method in step D.

A substituted polyacetylene having in a side chain a phenyl group substituted in the para position with an n-butyl group as shown in formula (5) below, was prepared as the polymer. This polymer easily dissolves in chloroform.

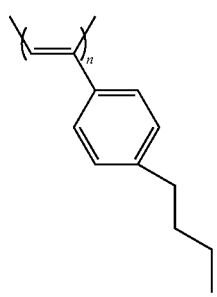

(5)

To 50 mg of powder of this polyacetylene, 1 mL of chloroform was added, and the mixture was thoroughly kneaded so that the polyacetylene was in a softened state. Immediately thereafter, chloroform was added to the polyacetylene. The powder was not in a dissolved state but portions that were dissolved exhibited good flowability and did not form strings by stretching. After about 10 minutes of kneading such that the powder was thoroughly kneaded and entered a softened state capable of forming strings, the proportion of the polyacetylene relative to chloroform increased, presumably because the kneading operation was conducted at room temperature in an open system without suppressing evaporation of chloroform.

A stainless-steel needle was inserted into this softened polyacetylene and immediately pulled out by about 50 mm. As a result, as shown in FIG. 3B, a string was formed between the softened polyacetylene and the tip of the needle. The central portion where the thickness was uniform was cut out for about 20 mm. This operation was conducted 10 times, and the ten strings (fibers) obtained thereby were observed under a microscope. The thickness of the ten fibers was in the range of 5 μm to 10 μm. A rotary stage of a polarizing microscope was rotated while the visual field was darkened by a polarizer and an analyzer in a cross-Nicol configuration. As a result, the entire fiber glowed blue and stopped glowing every 45°. It can be assumed from this that the entire fiber was oriented in the uniaxial direction. The fibers were cut to segments of about 5 mm to prepare 40 oriented fibers.

Next, as shown in FIG. 5B, two neodymium magnets (magnets containing neodymium, iron, boron, and the like as the main components) were placed about 2 cm apart such that they attracted each other. The intensity of the magnetic field between the magnets was measured with a teslameter (Handy tesla/gauss meter 410 produced by Lakeshore). The intensity was about 0.4 T at substantially any position between the magnets.

As shown in FIG. 5B, a square quartz glass plate with sides of about 1.8 cm was fixed such that the surface was parallel to the lines of magnetic force and perpendicular to the gravitational force. To the surface of the glass plate, about 1 mL of distilled water was added, and 40 oriented fibers were carefully placed on the water surface. The oriented fibers initially took various directions but all aligned in the direction of the lines of magnetic force after about 20 minutes.

The water on the quartz glass was carefully sucked with a pipette so as not to disturb the alignment of the oriented fibers on the water surface. Air drying was conducted to completely remove water from the quartz glass surface and the oriented fibers.

To a glass petri dish with an inner volume of about 13 mL, 0.5 mL of chloroform was added. A 5 mm glass cube was placed on the bottom, and the quartz glass plate with the oriented fiber group adhered thereon was placed on a surface of the glass cube. Then the glass petri dish was covered with a lid. In this state, the crystal group on the surface of the quartz glass surface did not come into contact with the chloroform solution but was exposed to chloroform vapor at a concentration of about 5 ppm. The petri dish was allowed to stand in this state at room temperature for about 10 hours. As a result, the oriented fiber group on the surface became bonded to each other to form a single film. The chloroform in the petri dish completely evaporated. The petri dish was opened and the quartz glass was taken out.

The quartz glass was observed on a rotary stage of a polarizing microscope. The entire face of the film glowed bright blue and stopped glowing every 45°. The film surface was also observed with a microscope, and it was confirmed that the film was a completely integral single film, although there was some nonuniformity in thickness. The polarized absorption was measured with a spectrometer and the dichroic ratio (D) at 320 nm was calculated. The dichroic ratio was 0.40. This confirmed that the entire face of the film formed a polarizing filter oriented in the uniaxial direction.

Comparative Example 2

The polyacetylene as in Example 4 was dissolved in chloroform to prepare a 10 mg/mL solution. To a square quartz glass slide with sides of about 1.8 cm and placed between neodymium magnets 2 cm apart from each other, 1 mL of this solution was added as in Example 1.

About 10 minutes later, the solvent on the glass slide was completely evaporated and a polyacetylene thin film was formed. The quartz glass slide was observed on a rotary stage of a polarizing microscope, and it was confirmed that the film was not uniaxially oriented. The polarized absorption was measured with a spectrometer and the dichroic ratio (D) at 320 nm was calculated. The dichroic ratio was 0.02.

Example 5

In this example, a polytetrafluoroethylene (Teflon® (trade name)) continuous oriented structure was made by employing a frictional transfer method in the step E, a flow-induced orientation method in step F, and the affixing method in step D.

Figure 14:
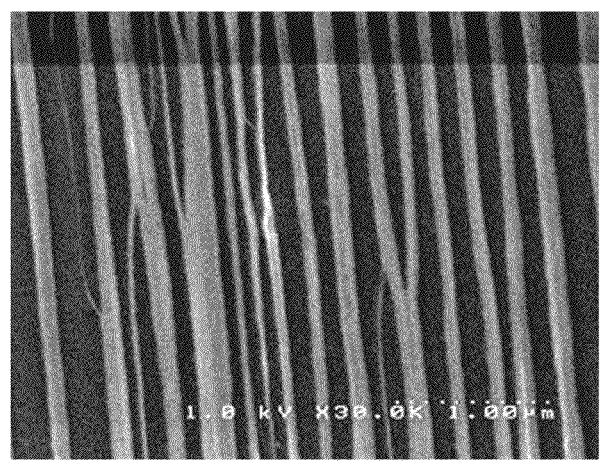
FIG. 14 is a photograph taken with a scanning electron microscope (SEM) showing the shape of the oriented fibers obtained by frictional transfer according to Example 2.

A polytetrafluoroethylene cubic pellet with sides of about 1.5 cm was prepared as the polymer. As shown in FIG. 4, while applying a load of about 20 kg, one side of the pellet was pressed on a surface of a silicon substrate whose surface was washed with acetone and thoroughly air-dried and which had a width of 2 cm and slid in one direction at a rate of 20 cm/sec. The slid portion turned slightly white. This whitened portion was cut out and its surface was observed with a scanning electron microscope (SEM). Polytetrafluoroethylene fibers having a thickness of about 200 nm and aligned in the moving direction of the pellet were observed as in FIG. 14.

About one hundred silicon substrates onto which frictional transfer was conducted in a similar manner were prepared and immersed in a UV curable resin (BeamSet® AQ-9C, produced by Arakawa Chemical Industries Ltd.) solution in a beaker. The substrates and the beaker were placed in a water tank-type ultrasonic cleaner to clean the substrate surfaces for about 10 minutes. The UV curable resin solution was replaced with new one to again conduct surface cleaning, and the substrates were removed. The UV curable resin solution was combined with the old one and the mixture was observed with naked eye. The mixture was slightly turbid. The observation with a microscope found that microscopic fibrous substances were suspended in the mixture.

A system as shown in FIG. 9 was prepared, and the turbid suspension described above was poured from the substrate-accommodating vessel 2705, and a glass substrate 2706 having substantially the same inner diameter as that of the substrate-accommodating vessel 2705 was immersed at the same time. Subsequently, while driving the pump 2702 to circulate the suspension, the UV curable resin solution filtered through the filter 2703 with 0.22 μm pore size was gradually removed from the system as indicated by the arrow 2707 using a pump (not shown) attached to the outlet-side of the filter.

After the suspension above the glass substrate was mostly evaporated to expose a turbid substrate surface, the pump 2702 was stopped, and the substrate 2706 was carefully discharged from the substrate-accommodating vessel 2705 so as not to allow the liquid on the substrate surface to flow out. The substrate was irradiated with UV light having a peak wavelength of 365 nm. The liquid cured in about 5 minutes.

Lastly, the glass substrate was superimposed on a polarizing filter, and the filter was turned. The entire surface of the film stopped transmitting light and became completely dark every 90°. This confirmed that the film had the entire surface oriented in the uniaxial direction and formed a polarizing filter that selectively transmits blue light.

Example 6

In this example, a continuous oriented structure containing polyacetylene and polytetrafluoroethylene (Teflon® (trade name)) was prepared. This is an example that uses two types of polymers.

First, polyacetylene oriented fibers were made as in Example 4, mixed into a UV curable resin as in Example 2, and pulverized with an ultrasonic homogenizer. The resulting product was observed with a microscope and it was observed that polyacetylene formed fibers about 100 μm in length. Then as in Example 5, a suspension of polytetrafluoroethylene microfibers in a UV curable resin was prepared.

After the polyacetylene fibers were combined with the polytetrafluoroethylene suspension, the flow-induced orientation and curing of the UV curable resin were conducted as in Example 4 to prepare a glass substrate with a thin film over the entire surface.

The glass substrate was superimposed on a polarizing filter, and the filter was rotated. The entire film stopped transmitting light and became completely dark every 90°. The transmittance of the quartz glass was measured with a spectrometer. It was found that the transmittances of two wavelengths, i.e., about 460 nm (blue) and about 610 nm (orange), were high. The polarized absorption was measured, and the dichroic ratio (D) at 320 nm was calculated. The dichroic ratio was 0.22. This confirmed that the entire surface of the film was oriented in the uniaxial direction and formed a polarizing filter selectively transmitting blue and orange light.

Comparative Example 3

A 10 mg/mL chloroform solution of the polyacetylene of Example 4 was prepared. An attempt was made to suspend finely pulverized chips of polytetrafluoroethylene in this solution, but polytetrafluoroethylene repelled chloroform and gathered on one spot on the liquid surface. Neither a solution nor a suspension containing both polyacetylene and polytetrafluoroethylene could be prepared.

Example 7

In this example, a device was fabricated by a drawing technique by forming linear wires on a glass substrate through steps H and I.

A helical substituted polyacetylene represented by formula (6) below polymerized to include propiolate with an ethyl group in a side chain was prepared as the polymer. This polymer dissolves in chloroform.

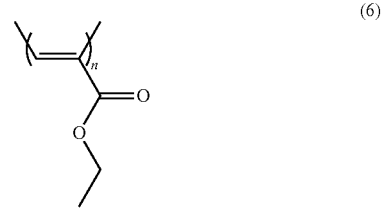

(6)

As shown in FIG. 11, a glass slide substrate 3201 about 3 cm in width and about 6 cm in length previously washed with acetone and thoroughly dried was placed on a table. Then a 20 mg/mL chloroform solution of the polyacetylene described above was prepared. About 100 μL of the solution was pipetted with a 0-200 mL dispensing pipette (produced by Gilson Inc.) having a pipette tip 3203 (composed of polypropylene) with an inner diameter of about 1 mm and an outer diameter of about 2 mm. The end of the pipette tip 3203 was used as a pen tip and a line 3202 about 2 mm in width and 10 mm in length was drawn by relatively moving the pen tip in the direction of the arrow 3204 parallel to the substrate while gradually discharging the solution from the pipette.

Another line 3202 about 30 mm in length and about 2 mm in width and yet another line 3202 about 50 mm in length and about 2 mm in width were drawn in the same manner. The three lines 3202 were parallel to each other with an interval of about 5 mm. The aspect ratios (length/width) of these linear droplets 10 mm, 30 mm, and 50 mm in length were 5, 15, and 25, respectively.

The glass slide was left to stand still. The droplets completely cured in about 10 minutes, and three linear films about 10 mm, 30 mm, and 50 mm in length and about 2 mm in width arranged parallel to each other at an interval of about 5 mm were obtained thereby.

The glass slide was placed between two polarizers in a cross-Nicol configuration and irradiated with light from below. The glass slide was observed from above while being rotated. The glass portion without any film thereon was always dark irrespective of the angle of rotation. In contrast, nearly all parts of the portions with three lines simultaneously glowed bright and stopped glowing every 45°, thereby indicating all of the three films had entire surfaces uniaxially oriented.

This confirmed that a device including three linear oriented structures 2 mm in width and 10 mm, 30 mm, and 50 mm in length at an interval of about 5 mm on a glass substrate was formed by the drawing technique.

Comparative Example 4

A chloroform solution of polyacetylene and a washed glass slide were prepared as in Example 7. A circular droplet about 2 mm in diameter was drawn using a pipette having a pipette tip as in Example 7. The aspect ratio of the droplet was 1.0.

The glass slide was allowed to stand still, and the droplet completely cured in about 10 minutes. A circular film about 2 mm in diameter was formed thereby.

This glass slide was placed between two polarizers and observed as in Example 7. As the glass slide was rotated, the film partially glowed bright and darkened at irregular intervals. This indicated that the film partially had random orientation.

Accordingly, it was confirmed that a device incorporating an oriented film could not be formed if the aspect ratio of the oriented film was 1.0.

Comparative Example 5

A chloroform solution of polyacetylene and a washed glass slide were prepared as in Example 7. Two linear droplets 10 mm in width and about 30 mm and 50 mm in length, respectively, were drawn on the glass slide with a 0-1000 mL dispensing pipette (Produced by Gilson Inc.) having a polypropylene pipette tip about 2 mm in inner diameter and about 4 mm in outer diameter. The aspect ratios of the two linear droplets were 3 and 5, respectively.

The glass slide was allowed to stand still, and the droplets completely cured in about 10 minutes. A film about 30 mm in length and a film about 50 mm in length and both about 10 mm in width were formed thereby.

The glass slide was placed between the two polarizers and observed as in Example 7. As the glass slide was rotated, the vicinity of the central axis of the film glowed bright in a straight line at a particular angle, but the vicinity of the bright straight line glowed in stripes in the direction orthogonal to the straight line. All parts of the bright portion simultaneously glowed bright and darkened substantially every 45° C. as the glass slide was rotated. This indicated that although the vicinity of the central axis of the film was oriented in the linear direction, the surrounding portions had oriented portions and unoriented portions mixed together.

Thus, it was confirmed that a device incorporating a film oriented in the longitudinal direction could not be formed if the width of the droplet was 10 mm.

Example 8

In this example, a device including a glass substrate and curved wires on the glass substrate was formed by a printing technique through steps H and I.

A chloroform solution of polyacetylene and a washed glass slide were prepared as in Example 7. Then, as shown in FIG. 12A, an anastatic plate 3301 constituted from a 5 cm×3 cm aluminum plate and a curved projection 3302 having a width of about 2 mm, a length of about 6 cm, and a height of about 5 mm formed on the aluminum plate was prepared. The curved projection 3302 had a shape constituted from two identical semicircles each connected to the other at one end thereof.

Then, as shown in FIG. 12B, the anastatic plate 3301 was moved downward in the direction of the arrow 3305. The projection 3302 was dipped in the polyacetylene solution in chloroform 3303 present in the container 3304 and moved upward in the direction of the arrow 3305. As a result, as shown in FIG. 12C, the solution 3306 of polyacetylene adhered on the projection 3302. Then as shown in FIG. 12D, the anastatic plate 3301 was moved downward in the direction of the arrow 3307, slowly pressed against the substrate 3308, and immediately moved upward in the direction of the arrow 3307. In this manner, as shown in FIG. 12E, the curved sinusoid droplet 3309 having a width of about 2 mm was transferred onto the surface of the glass slide.

The glass slide was left to stand still, and the droplet completely cured in about 10 minutes. As a result, a curved sinusoid film having a width of about 2 mm was formed.

This glass slide was placed between two polarizers and observed as in Example 7. The glass portion without any film thereon was always dark irrespective of the angle of rotation. In contrast, portions of the curved film with the same tangent vector simultaneously glowed bright. As the glass slide was rotated, the shining portion moved continuously, and when the position was rotated by 45°, the portion that had glowed became darkest. The shining portions on the curve were investigated to determine the tangent vector, and it was found that the vectors were either in the same direction or in the orthogonal direction and that nearly all parts of the curved film were oriented continuously in the longitudinal direction.

This confirmed that a device incorporating a curved oriented structure about 2 mm in width and 6 cm in length on a glass substrate was formed by the printing technique.

Example 9

In this example, a device including a silicon substrate with electrodes and a thin film over the interelectrode gap was formed by the ink jet technique through steps H and I.

A helical substituted polyacetylene having in a side chain a phenyl group substituted in the para position with an N-2- ethyl-hexyl group as shown in formula (7) below, was prepared as the polymer. This polymer dissolves in methyl alcohol.

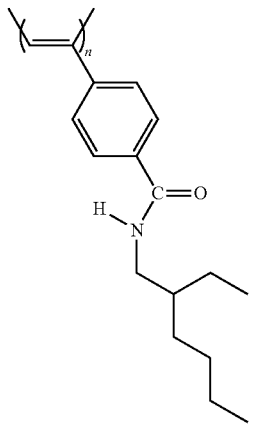

(7)

A 10 mg/mL methyl alcohol solution of the helical substituted polyacetylene was prepared and charged in an ink cartridge of an ink jet printer (PIXUS® 950i produced by Canon Inc.). The ink cartridge was loaded on the printer. A plurality of gold electrodes were formed at a gap width of 500 nm on a silicon oxide-coated surface of a silicon substrate. The thickness of the gold electrodes was about 100 nm, i.e., there was a step difference of about 100 nm between the electrodes and the substrate.

The silicon substrate was fed to the tray of the ink jet printer described above. As shown in FIG. 13, by using drawing software in the personal computer connected to the ink jet printer, a droplet extending across the gap between a pair of electrodes 3401A and 3401B and having the longitudinal direction orthogonal to the longitudinal direction of the gap was drawn. Straight or curved droplets 3402 having a width of 0.1 mm, 0.5 mm, 1 mm, 2 mm, and 5 mm, and a length of 40 mm were applied in the same manner. The volume of single ink microdroplet 3405 jetted out from the nozzle 3403 of the ink jet printer was 1 μL ($10^{-9}$ $cm^3$) and the diameter was about 10 μm. After the ink microdroplet landed on the substrate that does not absorb the ink solution, the microdroplet formed a semicircle about 20 μm in diameter. Amount of the solution ejected was not sufficient for the printer for making the device. Thus, jetting was repeated 4 times to apply the required amount of solution onto the substrate. In the test conducted in advance, the substrate with the solution applied thereon was observed with a stereoscopic microscope. It was confirmed that the individual droplets ejected combined with one another to form an integral droplet, thereby making droplets 0.1 mm, 0.5 mm, 1 mm, 2 mm, and 5 mm in length and 40 mm in width.

The substrate with the electrodes was left undisturbed. The narrowest droplet with a width of 0.1 mm completely cured in about 1 minute, and the widest droplet with a width of 5 mm completely cured in about 30 minutes. Only the droplet with a width of 5 mm shrank slightly to a width of about 4 mm, while other droplets maintained the same width after the curing.

This silicon substrate was observed on a rotary stage of an epi-illumination-type polarizing microscope. All parts of films other than one produced from the 5-mm-wide droplet glowed with the same brightness, while the brightness of the portions surrounding the film produced from the 5-mm-wide droplet was slightly lower. As the stage was rotated, the straight film glowed bright and darkened at the same angle and the curved film glowed bright and darkened at the same tangent vector, indicating that the entirety of each of the films was oriented continuously in the longitudinal direction.

Note that it is also possible to measure the electrical characteristics of the pair of electrodes separated by a gap over which the polyacetylene oriented structure was formed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A method for forming a continuous oriented structure of a polymer, the method comprising the steps of:
   pulverizing a polycrystalline structure of the polymer to provide single crystals between a pair of electrodes;
   applying an electrical field to the single crystals to form a single crystal group containing uniformly oriented single crystals using the pair of electrodes;
   dissolving or melting surface portions of the single crystals; and
   bonding the dissolved or melted surface portions of the single crystals to each other to form a continuous oriented structure.

2. The method according to claim 1, wherein, in the dissolving or melting step, the surface portions of the single crystals are dissolved with a solvent or melted by heating.

3. The method according to claim 1, wherein, in the step of bonding, the single crystal group is affixed on a substrate or in a resin to form the continuous oriented structure.

* * * * *